US010003823B2

(12) United States Patent
Chiu et al.

(10) Patent No.: US 10,003,823 B2
(45) Date of Patent: Jun. 19, 2018

(54) VIDEO DECODER AND VIDEO ENCODER USING STORAGE SHARING TECHNIQUE FOR PERFORMING DECODING AND ENCODING FUNCTIONS COMPLYING WITH DIFFERENT VIDEO CODING STANDARDS AND ASSOCIATED SHARED STORAGE DEVICE

(71) Applicant: MEDIATEK INC., Hsin-Chu (TW)

(72) Inventors: Min-Hao Chiu, Hsinchu (TW); Yung-Chang Chang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 233 days.

(21) Appl. No.: 15/007,232

(22) Filed: Jan. 27, 2016

(65) Prior Publication Data

US 2016/0227240 A1 Aug. 4, 2016

Related U.S. Application Data

(60) Provisional application No. 62/109,848, filed on Jan. 30, 2015.

(51) Int. Cl.
*H04N 19/70* (2014.01)
*H04N 19/12* (2014.01)

(52) U.S. Cl.
CPC ............ *H04N 19/70* (2014.11); *H04N 19/12* (2014.11)

(58) Field of Classification Search
CPC ............................. H04N 19/70; H04N 19/12
See application file for complete search history.

(56) References Cited

U.S. PATENT DOCUMENTS

2006/0268985 A1* 11/2006 Liang .................. H04N 19/61
375/240.16
2011/0170612 A1 7/2011 Hsiao

FOREIGN PATENT DOCUMENTS

| CN | 1551633 A | 12/2004 |
|---|---|---|
| CN | 1905675 A | 1/2007 |
| CN | 101646084 A | 2/2010 |

* cited by examiner

*Primary Examiner* — Nam Pham
(74) *Attorney, Agent, or Firm* — Winston Hsu

(57) ABSTRACT

A video decoder has a first processing circuit and a second processing circuit. A shared storage device is accessible to the first processing circuit and the second processing circuit. The first processing circuit performs a first decoding operation according to data access of the shared storage device. The second processing circuit performs a second decoding operation according to data access of the shared storage device. The first decoding operation is at least a portion of a first decoding function complying with a first video coding standard, and the second decoding operation is at least a portion of a second decoding function complying with a second video coding standard different from the first video coding standard.

20 Claims, 24 Drawing Sheets

VIDEO DECODER AND VIDEO ENCODER USING STORAGE SHARING TECHNIQUE FOR PERFORMING DECODING AND ENCODING FUNCTIONS COMPLYING WITH DIFFERENT VIDEO CODING STANDARDS AND ASSOCIATED SHARED STORAGE DEVICE

CROSS REFERENCE TO RELATED APPLICATIONS

This application claims the benefit of U.S. provisional application No. 62/109,848, filed on Jan. 30, 2015 and incorporated herein by reference.

BACKGROUND

The present invention relates to a video decoder design and a video encoder design, and more particularly, to a video decoder with a shared storage device accessed by decoding functions of different video coding standards, a video encoder with a shared storage device accessed by encoding functions of different video coding standards, and the associated shared storage device.

The conventional video coding standards generally adopt a block based coding technique to exploit spatial and temporal redundancy. For example, the basic approach is to divide the whole source frame into a plurality of blocks, perform prediction on each block, transform residues of each block, and perform quantization, scan and entropy encoding. Besides, a reconstructed frame is generated in a coding loop to provide reference pixel data used for coding following blocks. For example, inverse scan, inverse quantization, and inverse transform may be included in the coding loop to recover residues of each block that will be added to predicted samples of each block for generating a reconstructed frame. The inverse scan operation, inverse quantization operation, and inverse transform operation are also performed in a video decoder for recovering residues of each block and generating a reconstructed frame.

With regard to any of the scan operation and the inverse scan operation, it requires a memory for writing transform coefficients in one order and reading transform coefficients in a different order. With regard to any of the quantization operation and the inverse quantization operation, it requires a memory for storing a table referenced for providing quantization-related parameters. When a video encoder/decoder is designed to support different video coding standards, multiple memory devices are generally implemented for use by scan/inverse scan of different video coding standards, and multiple memory devices are generally implemented for use by quantization/inverse quantization of different video coding standards. However, such a video encoder/decoder design is not cost-efficient.

SUMMARY

One of the objectives of the claimed invention is to provide a video decoder with a shared storage device accessed by decoding functions of different video coding standards, a video encoder with a shared storage device accessed by encoding functions of different video coding standards, and the associated shared storage device.

According to a first aspect of the present invention, an exemplary video decoder is disclosed. The exemplary video decoder includes a first processing circuit, and a second processing circuit. A shared storage device is accessible to the first processing circuit and the second processing circuit. The first processing circuit is arranged to perform a first decoding operation according to data access of the shared storage device. The second processing circuit is arranged to perform a second decoding operation according to data access of the shared storage device. The first decoding operation is at least a portion of a first decoding function complying with a first video coding standard, and the second decoding operation is at least a portion of a second decoding function complying with a second video coding standard different from the first video coding standard.

According to a second aspect of the present invention, an exemplary video encoder is disclosed. The exemplary video encoder includes a first processing circuit, and a second processing circuit. A shared storage device is accessible to the first processing circuit and the second processing circuit. The first processing circuit is arranged to perform a first encoding operation according to data access of the shared storage device. The second processing circuit is arranged to perform a second encoding operation according to data access of the shared storage device. The first encoding operation is at least a portion of a first encoding function complying with a first video coding standard, and the second encoding operation is at least a portion of a second encoding function complying with a second video coding standard different from the first video coding standard.

According to a third aspect of the present invention, an exemplary shared storage device is disclosed. The exemplary shared storage device includes at least one storage area. The at least one storage area is shared by a first operation complying with a first video coding standard and a second operation complying with a second video coding standard different from the first video coding standard. The at least one storage area is accessed by the first operation according to storage addresses configured for the first operation, and is further accessed by the second operation according to storage addresses configured for the second operation.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
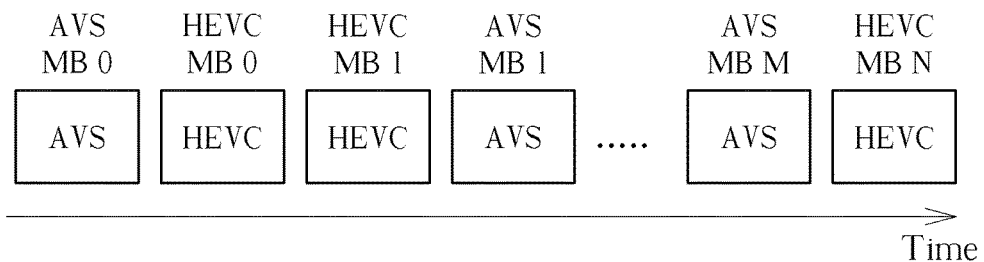
FIG. 1 is a diagram illustrating a macroblock (MB) level (or a largest coding unit (LCU)/coding unit (CU) level) source change process according to an embodiment of the present invention.

For some applications, display data provided by different video sources may be displayed on the same display screen in a picture-in-picture (PIP) manner or a picture-outside-picture (POP) manner. Hence, to alternately encode/decode the display data provided by different video sources, a source change process may be performed. FIG. 1 is a diagram illustrating a macroblock (MB) level (or a largest coding unit (LCU)/coding unit (CU) level) source change process according to an embodiment of the present invention. Two different video coding standards, such as AVS (Audio Video coding Standard) and HEVC (High Efficiency Video Coding), may be employed to encode/decode pictures to be displayed on the same display screen in a PIP manner or a POP manner. One picture to be encoded/decoded by AVS may be regarded as having a plurality of processing units (e.g., MBs, LCUs, or CUs), and another picture to be encoded/decoded by HEVC may be regarded as having a plurality of processing units (e.g., MBs, LCUs, or CUs). In this example, since an MB level source change process is employed, one MB is encoded/decoded by AVS after one MB is encoded/decoded by HEVC, and/or one MB is encoded/decoded by HEVC after one MB is encoded/decoded by AVS.

Figure 2:
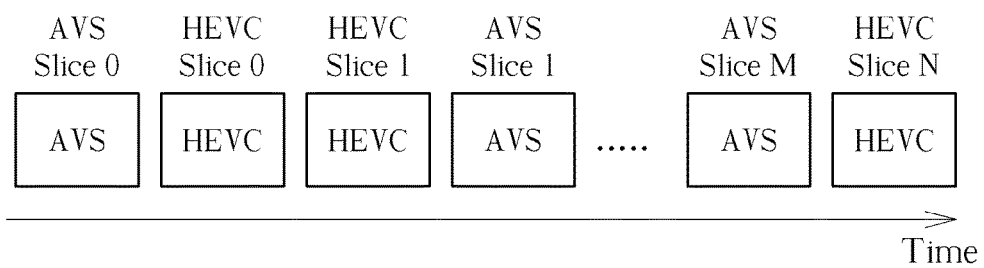
FIG. 2 is a diagram illustrating a slice level source change process according to an embodiment of the present invention.

FIG. 2 is a diagram illustrating a slice level source change process according to an embodiment of the present invention. Two different video coding standards, such as AVS and HEVC, may be employed to encode/decode pictures to be displayed on the same display screen in a PIP manner or a POP manner. One picture to be encoded/decoded by AVS may be regarded as having a plurality of slices each having one or more MB/LCU/CU rows, and another picture to be encoded/decoded by HEVC may be regarded as having a plurality of slices each having one or more MB/LCU/CU rows. In this example, since a slice level source change process is employed, one slice is encoded/decoded by AVS after one slice is encoded/decoded by HEVC, and/or one slice is encoded/decoded by HEVC after one slice is encoded/decoded by AVS.

Figure 3:
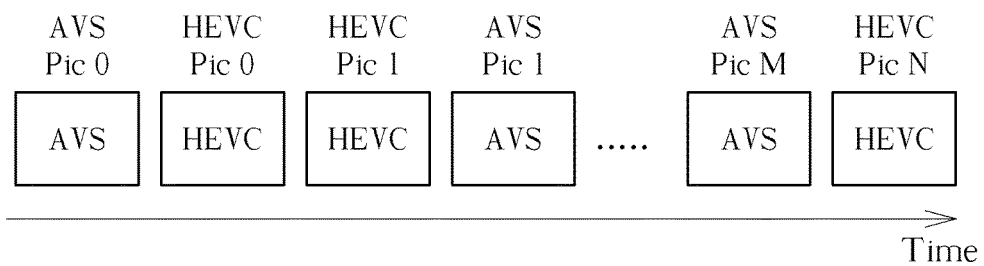
FIG. 3 is a diagram illustrating a picture level source change process according to an embodiment of the present invention.

FIG. 3 is a diagram illustrating a picture level source change process according to an embodiment of the present invention. Two different video coding standards, such as AVS and HEVC, may be employed to encode/decode pictures to be displayed on the same display screen in a PIP manner or a POP manner. In this example, since a picture level source change process is employed, one picture is encoded/decoded by AVS after one picture is encoded/decoded by HEVC, and/or one picture is encoded/decoded by HEVC after one picture is encoded/decoded by AVS.

To cope with the picture level/slice level/MB (or LCU/CU) level source change process, a video decoder/encoder should be designed to support different video coding standards (e.g., AVS and HEVC). In accordance with the AVS coding standard, the decoder/encoder hardware needs to store residual of an 8×8 block to perform a spatial-remapping function (e.g., an inverse scan (IS) function or a scan (S) function). In accordance with the HEVC coding standard, the decoder/encoder hardware needs to store residual of a 4×4/8×8/16×16/32×32 transform unit to perform a spatial-remapping function (e.g., an IS function or an S function). The present invention proposes using a storage sharing design to mitigate the memory size requirement of inverse scan/scan function complying with different video coding standards. Moreover, in accordance with the AVS coding standard, the decoder/encoder hardware needs to store AVS inverse quantization (IQ)/quantization (Q) table (e.g., a weight quant matrix, a de-quant table, and/or a shift table) to perform a band-remapping function (e.g., an IQ function or a Q function). In accordance with the HEVC coding standard, the decoder/encoder hardware needs to store HEVC IQ/Q table (e.g., a scaling list) to perform a band-remapping function (e.g., an IQ function or a Q function). The present invention further proposes using a storage sharing design to mitigate the memory size requirement of IQ/Q function complying with different video coding standards. Further details of the proposed storage sharing technique employed in a video decoder/encoder are described as below.

Figure 4:
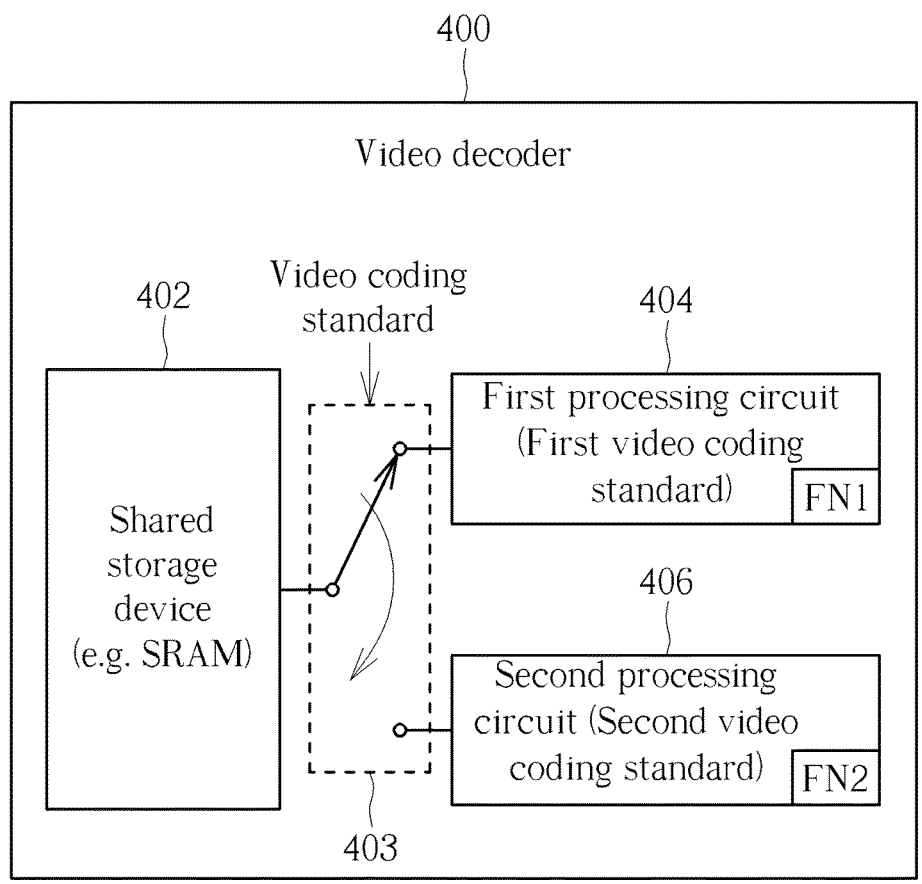
FIG. 4 is a diagram illustrating a video decoder using a proposed storage sharing technique according to an embodiment of the present invention.

FIG. 4 is a diagram illustrating a video decoder using a proposed storage sharing technique according to an embodiment of the present invention. The video decoder 400 includes a shared storage device 402, a control circuit 403, a first processing circuit 404, and a second processing circuit 406. It should be noted that only the circuit components pertinent to the present invention are shown in FIG. 4. In practice, the video decoder 400 further includes other circuit components for achieving the complete decoding functionality. The shared storage device 402 is accessible to the first processing circuit 404 and the second processing circuit 406 via the control circuit 403. For example, the shared storage device 402 may be implemented using a memory device such as a static random access memory (SRAM), and the control circuit 403 may be implemented using a switch device controlled based on a current video coding standard being processed. The first processing circuit 404 is arranged to perform a first decoding operation FN1 according to data access of the shared storage device 402 when the shared storage device 402 is accessible to the first processing circuit 404. The second processing circuit 406 is arranged to perform a second decoding operation FN2 according to data access of the shared storage device 402 when the shared storage device 402 is accessible to the second processing circuit 406. In this embodiment, the first decoding operation FN1 is at least a portion (i.e., part or all) of a first decoding function complying with a first video coding standard, and the second decoding operation FN2 is at least a portion (i.e., part or all) of a second decoding function complying with a second video coding standard different from the first video coding standard. In one exemplary design, one of the first video coding standard and the second video coding standard may be an AVS coding standard, and the other of the first video coding standard and the second video coding standard may be an HEVC coding standard. However, this is for illustrative purposes only, and is not meant to be a limitation of the present invention. For example, the first video coding standard and the second video coding standard may be selected from various video coding standards, including HEVC, AVS, H.264/AVC (Advanced Video Coding), AVS2, etc.

As shown in FIG. 4, when the current video coding standard being processed is switched from the second video coding standard to the first video coding standard due to the aforementioned picture level/slice level/MB (or LCU/CU) level source change process, the control circuit 403 is operative to connect the shared storage device 402 and the first processing circuit 404, thus allowing the first processing circuit 404 to use the shared storage device 402 to complete the first decoding operation FN1 for one picture/slice/MB (or LCU/CU). When the current video coding standard being processed is switched from the first video coding standard to the second video coding standard due to the aforementioned picture level/slice level/MB (or LCU/CU) level source change process, the control circuit 403 is operative to connect the shared storage device 402 and the second processing circuit 406, thus allowing the second processing circuit 406 to use the shared storage device 402 to complete the second decoding operation FN2 for one picture/slice/MB (or LCU/CU). By way of example, but not limitation, the first decoding function and the second decoding function are the same decoding function, such as a spatial-remapping function (e.g., inverse scan function) or a band-remapping function (e.g., inverse quantization function). For better understanding of technical features of the present invention, several exemplary video decoder designs are discussed as below.

Figure 5:
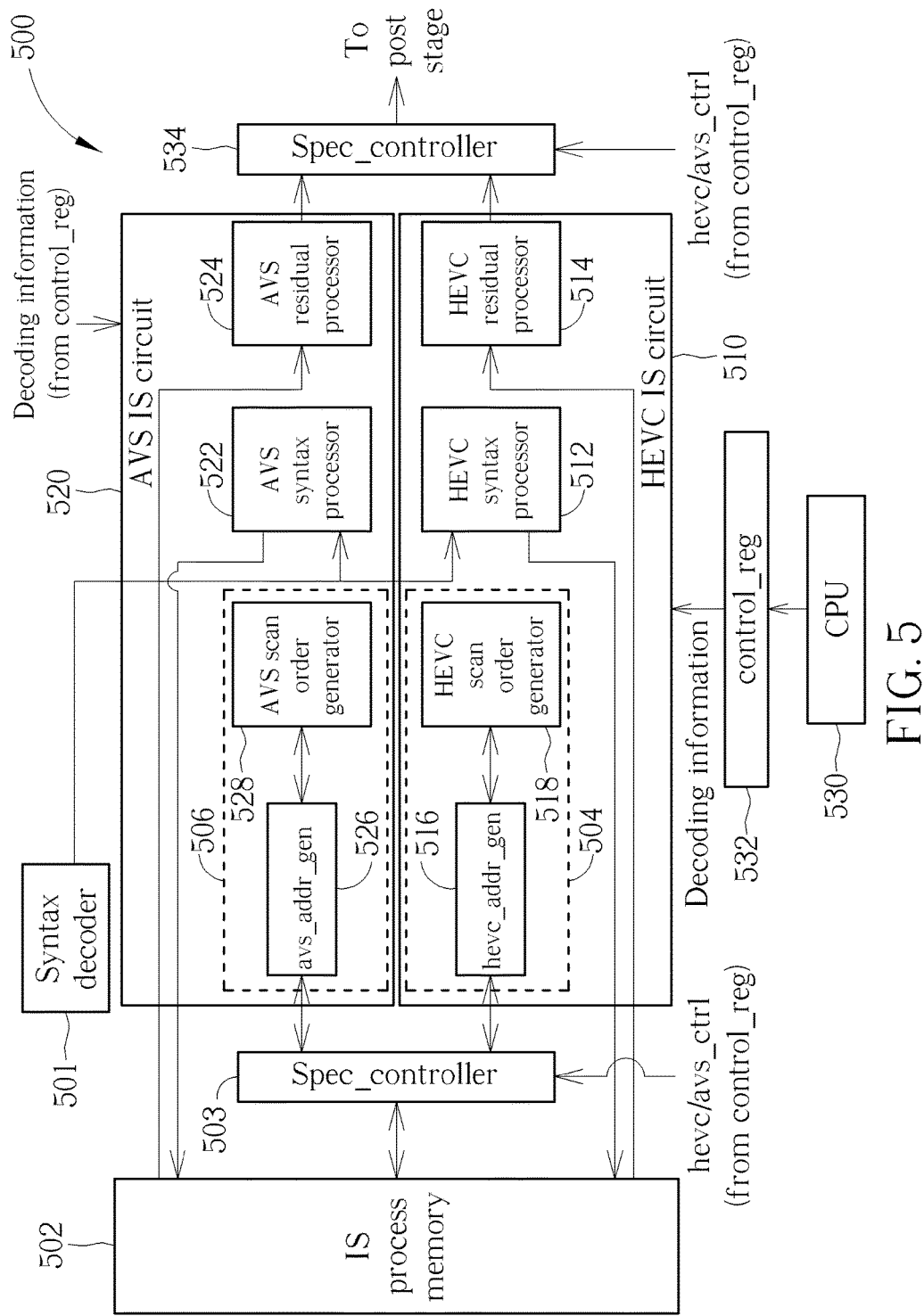
FIG. 5 is a diagram illustrating a video decoder with first proposed architecture of multi-standard spatial-remapping process according to an embodiment of the present invention.

FIG. 5 is a diagram illustrating a video decoder with first proposed architecture of multi-standard spatial-remapping process according to an embodiment of the present invention. For clarity and simplicity, it is assumed that the first video coding standard is the HEVC coding standard, and the second video coding standard is the AVS coding standard. The video decoder 500 employs the exemplary architecture shown in FIG. 4. As shown in FIG. 5, the video decoder 500 includes an inverse scan (IS) process memory 502 acting as the shared storage device 402 in FIG. 4, a specification controller (denoted by spec_controller) 503 acting as the control circuit 403 in FIG. 4, an HEVC inverse scan order processing circuit 504 acting as the first processing circuit 404 in FIG. 4, and an AVS inverse scan order processing circuit 506 acting as the second processing circuit 406 in FIG. 4. The HEVC inverse scan order processing circuit 504 includes an HEVC address generator (denoted by hevc_addr_gen) 516 and an HEVC scan order generator 518. The AVS inverse scan order processing circuit 506 includes an AVS address generator (denoted by avs_addr_gen) 526 and an AVS scan order generator 528. In this embodiment, an HEVC inverse scan circuit 510 further includes an HEVC syntax processor 512 and an HEVC residual processor 514, and an AVS inverse scan circuit 520 further includes an AVS syntax processor 522 and an AVS residual processor 524.

A central processing unit (CPU) 530 is arranged to determine a current video coding standard being processed according to a source change process, and write decoding information into a control register (denoted by control_reg) 532 correspondingly. The decoding information recorded in the control register 532 provides a control setting hevc/avs_ctrl to the specification controller 503, and further provides the control setting hevc/avs_ctrl to another specification controller 534. The control setting hevc/avs_ctrl controls the specification controller 503 to allow one of HEVC inverse scan circuit 510 and AVS inverse scan circuit 520 to perform data access upon the shared storage device (e.g., inverse scan process memory 502), and controls the specification controller 534 to allow one of HEVC inverse scan circuit 510 and AVS inverse scan circuit 520 to output inverse-scanned quantized transform coefficients to a post stage (e.g., an inverse quantization stage). Moreover, the decoding information recorded in the control register 532 further provides control settings to HEVC inverse scan circuit 510 (particularly, HEVC scan order generator 518, HEVC syntax processor 512, and HEVC residual processor 514) and AVS inverse scan circuit 520 (particularly, AVS scan order generator 528, AVS syntax processor 522, and AVS residual processor 524).

Consider a case where a current video coding standard being processed for one pixel data set (which may correspond to one picture if a picture level source change process is employed, or may correspond to one slice if a slice level source change process is employed, or may correspond to one MB (or LCU/CU) if an MB (or LCU/CU) level source change process is employed) is the HEVC coding standard. The specification controller 503 grants an access right of the inverse scan process memory 502 to the HEVC inverse scan circuit 510. The syntax decoding result (e.g., quantized transform coefficients of residual) generated from a syntax decoder (e.g., entropy decoder) 501 is processed and buffered by the HEVC syntax processor 512, and the HEVC syntax processor 512 outputs the buffered syntax decoding result (e.g., quantized transform coefficients of residual) to the inverse scan process memory 502. The HEVC scan order generator 518 generates an HEVC inverse scan order according to the decoding information and an HEVC inverse scan table. The HEVC address generator 516 refers to the HEVC inverse scan order to determine memory addresses of the inverse scan process memory 502 for HEVC spatial-remapping. That is, quantized transform coefficients sequentially stored into the inverse scan process memory 502 are read according to the memory addresses configured in an inverse scan order. The HEVC residual processor 514 receives HEVC inverse scan data (e.g., inverse-scanned quantized transform coefficients) read from the inverse scan process memory 502 according to the memory addresses generated by the HEVC address generator 516, processes and buffers the HEVC inverse scan data, and outputs the buffered HEVC inverse scan data to a post stage (e.g., an HEVC inverse quantization stage) via the specification controller 534.

Consider another case where a current video coding standard being processed for one pixel data set (which may correspond to one picture if a picture level source change process is employed, or may correspond to one slice if a slice level source change process is employed, or may correspond to one MB (or LCU/CU) if an MB (or LCU/CU) level source change process is employed) is the AVS coding standard. The specification controller 503 grants an access right of the inverse scan process memory 502 to the AVS inverse scan circuit 520. The syntax decoding result (e.g., quantized transform coefficients of residual) generated from the syntax decoder (e.g., entropy decoder) 501 is processed and buffered by the AVS syntax processor 522, and the AVS syntax processor 522 outputs the buffered syntax decoding result (e.g., quantized transform coefficients of residual) to the inverse scan process memory 502. The AVS scan order generator 528 generates an AVS inverse scan order according to the decoding information and an AVS inverse scan table. The AVS address generator 526 refers to the AVS inverse scan order to determine memory addresses of the inverse scan process memory 502 for AVS spatial-remapping. That is, quantized transform coefficients sequentially stored into the inverse scan process memory 502 are read according to the memory addresses configured in an inverse scan order. The AVS residual processor 524 receives AVS inverse scan data (e.g., inverse-scanned quantized transform coefficients) read from the inverse scan process memory 502 according to the memory addresses generated by the AVS address generator 526, processes and buffers the AVS inverse scan data, and outputs the buffered AVS inverse scan data to a post stage (e.g., an AVS inverse quantization stage) via the specification controller 534.

Figure 6:
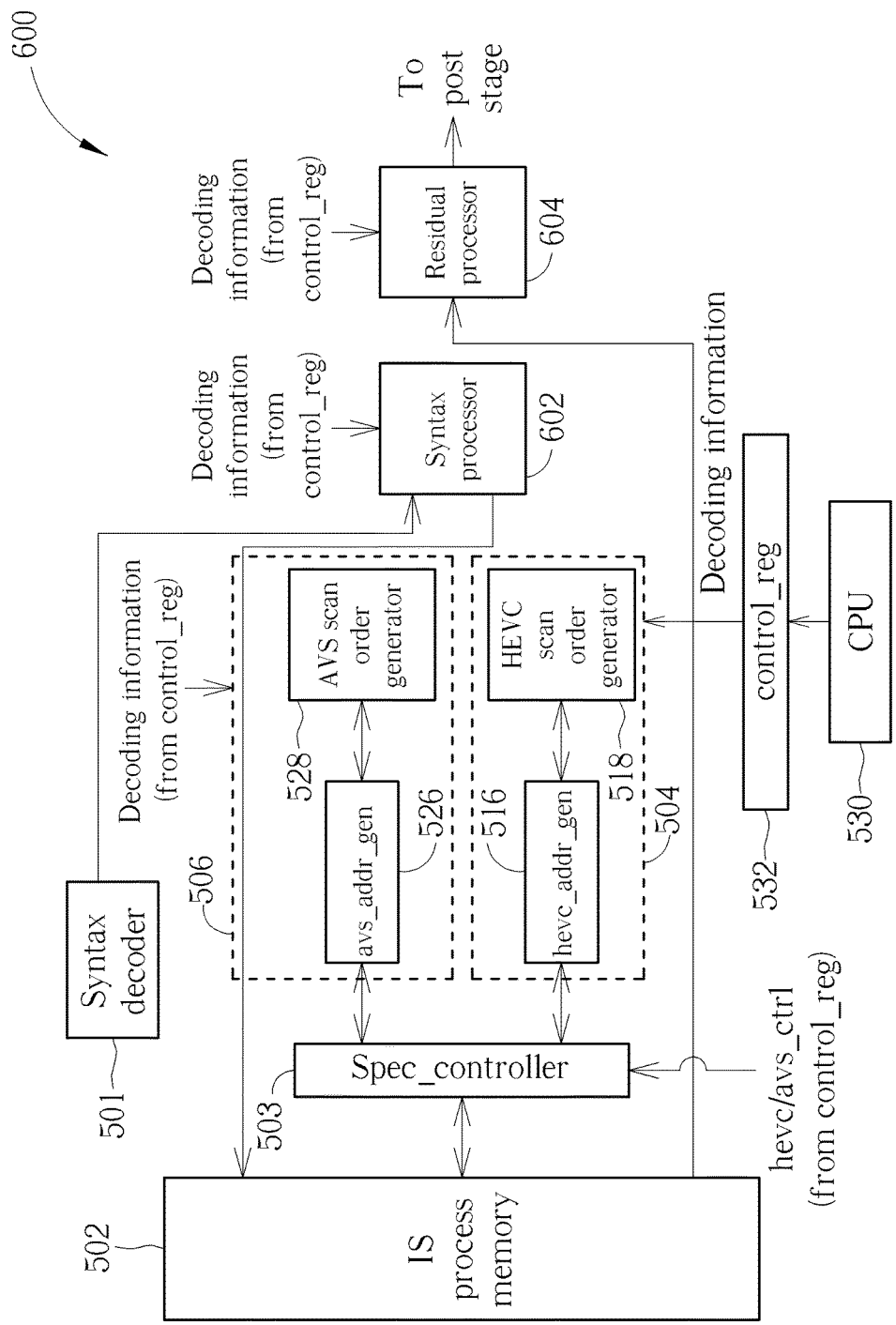
FIG. 6 is a diagram illustrating a video decoder with second proposed architecture of multi-standard spatial-remapping process according to an embodiment of the present invention.

With regard to the video decoder design shown in FIG. 5, the HEVC inverse scan circuit 510 has one dedicated syntax processor 512 and one dedicated residual processor 514, and the AVS inverse scan circuit 520 has one dedicated syntax processor 522 and one dedicated residual processor 524. Alternatively, a hardware sharing technique may be employed for hardware cost reduction. FIG. 6 is a diagram illustrating a video decoder with second proposed architecture of multi-standard spatial-remapping process according to an embodiment of the present invention. The major difference between video decoders 500 and 600 is that the video decoder 600 includes a syntax processor 602 being a shared processing circuit for different video coding standards (e.g., HEVC and AVS), and further includes a residual processor 604 being a shared processing circuit for different video coding standards (e.g., HEVC and AVS).

With regard to the syntax processor 602, it is arranged to process and buffer a first data to be stored into a shared storage device (e.g., HEVC syntax decoding result generated from the syntax decoder 501 to the inverse scan process memory 502), and is further arranged to process and buffer a second data to be stored into the shared storage device (e.g., AVS syntax decoding result generated from the syntax decoder 501 to the inverse scan process memory 502), where the first data stored in the shared storage device is accessed by a first processing circuit (e.g., HEVC inverse scan order processing circuit 504), and the second data stored in the shared storage device is accessed by a second processing circuit (e.g., AVS inverse scan order processing circuit 506). With regard to the residual processor 604, it is arranged to process and buffer the first data retrieved from the shared storage device by the first processing circuit, and output the buffered first data to a post stage (e.g., HEVC inverse quantization stage), and is further arranged to process and buffer the second data retrieved from the shared storage device by the second processing circuit, and output the buffered second data to a post stage (e.g., AVS inverse quantization stage).

Figure 7:
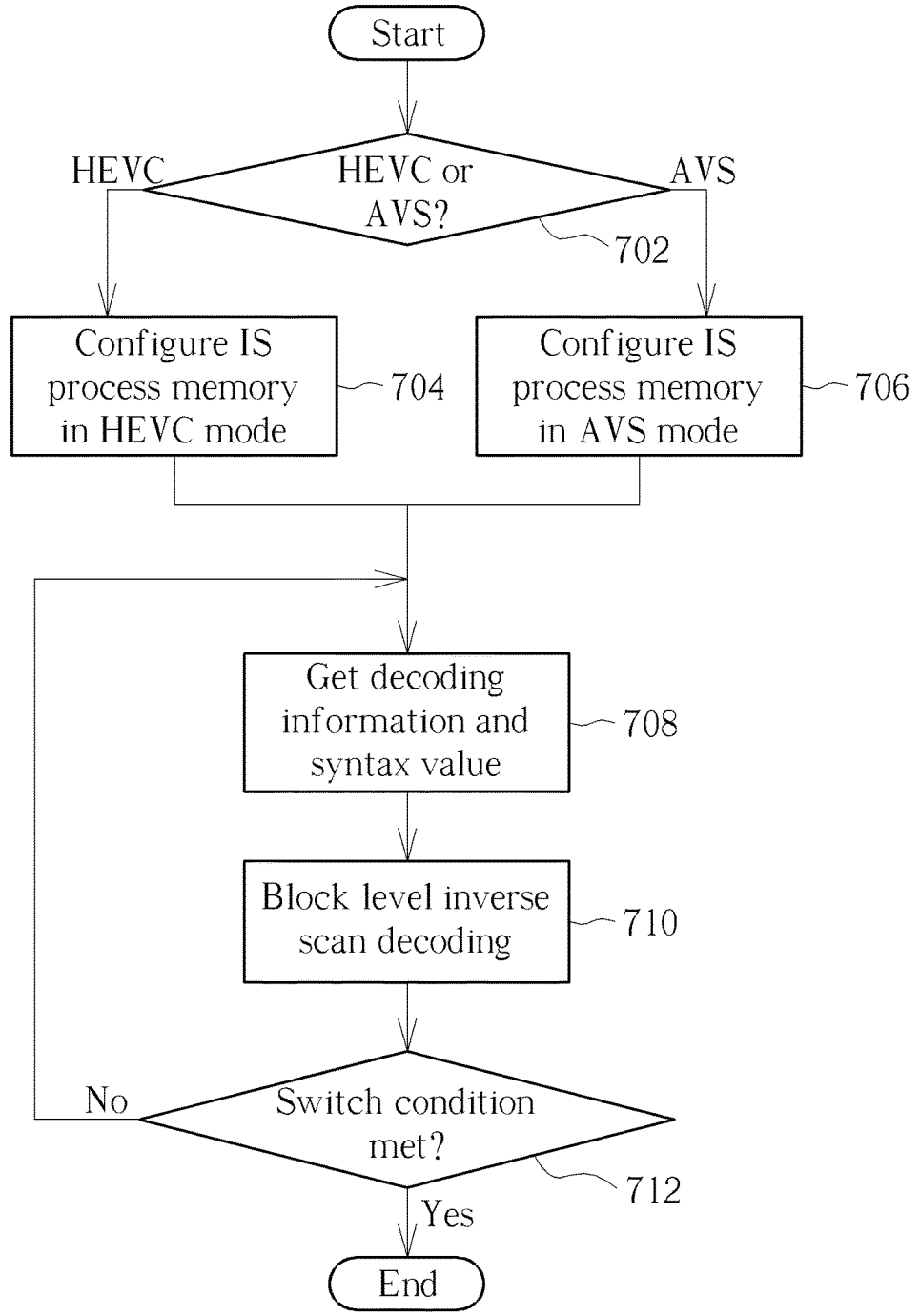
FIG. 7 is a flowchart illustrating a spatial-remapping decoding method applied to a source change process according to an embodiment of the present invention.

FIG. 7 is a flowchart illustrating a spatial-remapping decoding method applied to a source change process according to an embodiment of the present invention. Provided that the result is substantially the same, the steps are not required to be executed in the exact order shown in FIG. 7. For clarity and simplicity, it is assumed that the source change process is configured to switch between decoding operations of two different video coding standards such as the HEVC coding standard and the AVS coding standard. In step 702, the CPU 530 determines whether a current video coding standard being processed is the HEVC coding standard or the AVS coding standard. When the current video coding standard being processed is the HEVC coding standard, the flow proceeds with step 704 to configure the inverse scan process memory 502 in an HEVC mode. When the current video coding standard being processed is the AVS coding standard, the flow proceeds with step 706 to configure the inverse scan process memory 502 in an AVS mode. The inverse scan process memory 502 is shared by HEVC IS function and AVS IS function, and can be configured using a cost-efficiency arrangement or a power-efficiency arrangement. Further details of the cost-efficiency arrangement and the power-efficiency arrangement of the shared storage device are described later.

After the inverse scan process memory 502 is properly configured for the current video coding standard being processed, step 708 is performed to get the decoding information from the control register 532 set by the CPU 530 and syntax values (e.g., quantized transform coefficients of residual) generated from the syntax decoder 501. In step 710, a block level inverse scan decoding operation is performed to read syntax values (e.g., quantized transform coefficients of residual) of each block from the inverse scan process memory 502 according to an inverse scan order. In step 712, the CPU 530 checks if a switch condition of the source change process is met. For example, when a picture level source change process is employed, the switch condition of the source change process is met if a block level inverse scan decoding operation has been applied to all macroblocks in a picture. For another example, when a slice level source change process is employed, the switch condition of the source change process is met if a block level inverse scan decoding operation has been applied to all macroblocks in a slice. For yet another example, when an MB (or LCU/CU) level source change process is employed, the switch condition of the source change process is met if a block level inverse scan decoding operation has been applied to one macroblock (or all macroblocks in an LCU/CU).

Figure 8:
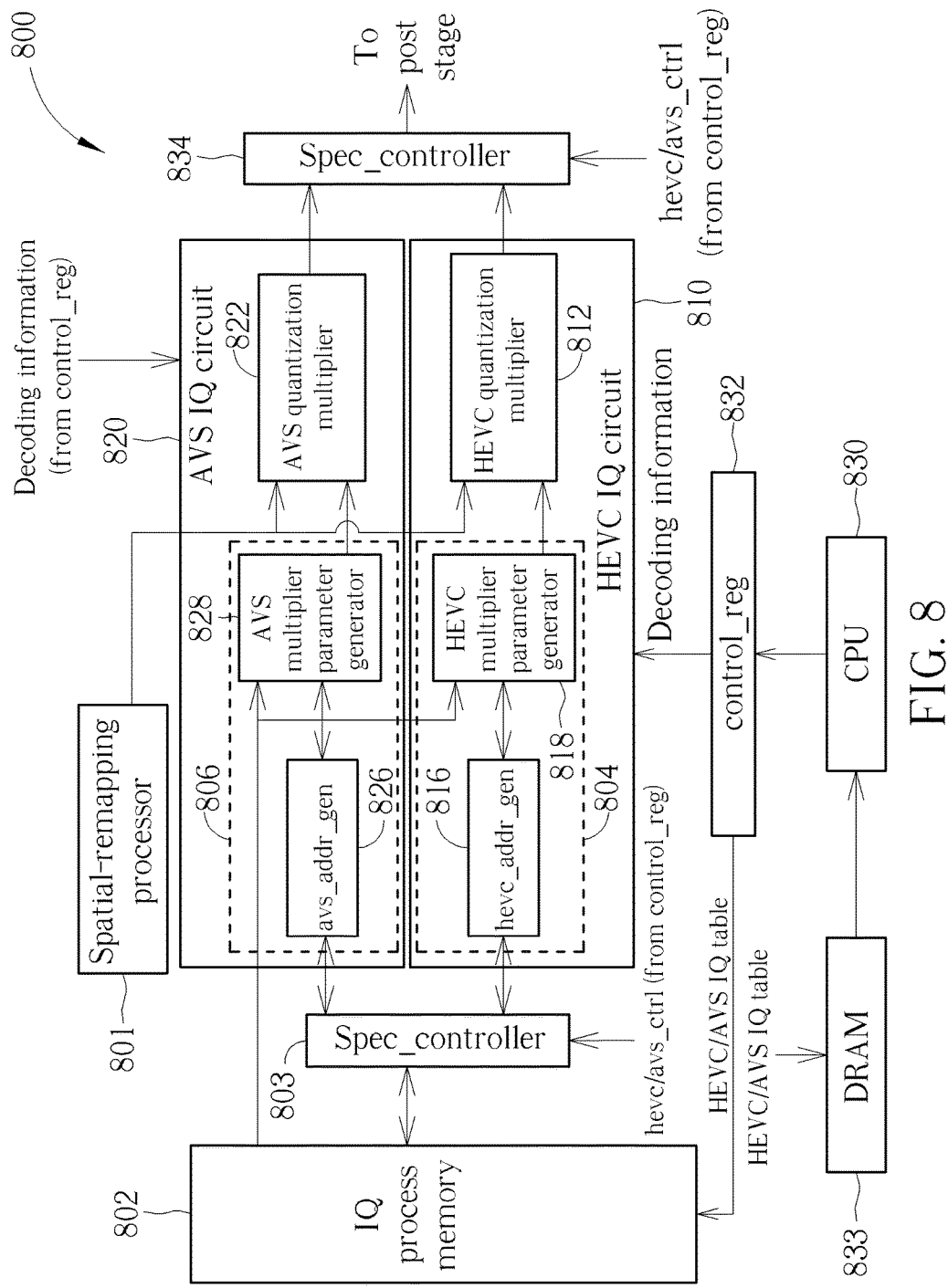
FIG. 8 is a diagram illustrating a video decoder with first proposed architecture of multi-standard band-remapping process according to an embodiment of the present invention.

FIG. 8 is a diagram illustrating a video decoder with first proposed architecture of multi-standard band-remapping process according to an embodiment of the present invention. For clarity and simplicity, it is assumed that the first video coding standard is the HEVC coding standard, and the second video coding standard is the AVS coding standard. The video decoder 800 employs the exemplary architecture shown in FIG. 4. As shown in FIG. 8, the video decoder 800 includes an inverse quantization (IQ) process memory 802 acting as the shared storage device 402 in FIG. 4, a specification controller (denoted by spec_controller) 803 acting as the control circuit 403 in FIG. 4, an HEVC inverse quantization parameter processing circuit 804 acting as the first processing circuit 404 in FIG. 4, and an AVS inverse quantization parameter processing circuit 806 acting as the second processing circuit 406 in FIG. 4. The HEVC inverse quantization parameter processing circuit 804 includes an HEVC address generator (denoted by hevc_addr_gen) 816 and an HEVC multiplier parameter generator 818. The AVS inverse quantization parameter processing circuit 806 includes an AVS address generator (denoted by avs_addr_gen) 826 and an AVS multiplier parameter generator 828. In this embodiment, an HEVC inverse quantization circuit 810 further includes an HEVC quantization multiplier 812, and an AVS inverse quantization circuit 820 further includes an AVS quantization multiplier 822.

A CPU 830 is arranged to determine a current video coding standard being processed according to a source change process, and write decoding information into a control register (denoted by control_reg) 832 correspondingly. An inverse quantization table of each video coding standard may be obtained and then stored in a dynamic random access memory (DRAM) 833. For example, an inverse quantization table of the HEVC coding standard may include a scaling list, and an inverse quantization table of the AVS coding standard may include a weight quant matrix, de-quant table and/or a shift table. In a first exemplary design where an inverse quantization table of a current video coding standard being processed is loaded into the inverse quantization process memory 802 on demand, an HEVC inverse quantization table is read from the DRAM 833 and loaded into the inverse quantization process memory 802 each time the current video coding standard being processed is switched to the HEVC coding standard, and an AVS inverse quantization table is read from the DRAM 833 and loaded into the inverse quantization process memory 802 each time the current video coding standard being processed is switched to the AVS coding standard. In other words, the HEVC inverse quantization table and the AVS inverse quantization table do not co-exist in the inverse quantization process memory 802. In a second exemplary design where an HEVC inverse quantization table and an AVS inverse quantization table are both loaded into the inverse quantization process memory 802, the HEVC inverse quantization table and the AVS inverse quantization table therefore co-exist in the inverse quantization process memory 802.

Figure 9:
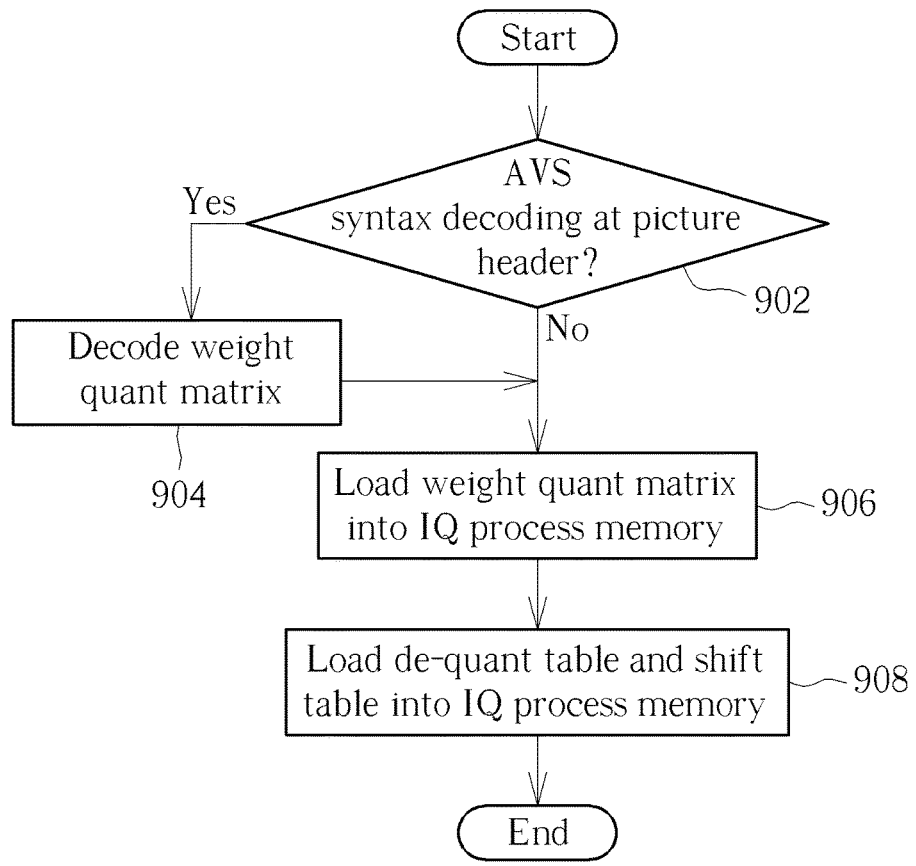
FIG. 9 is a flowchart illustrating a method of initializing an AVS inverse quantization table according to an embodiment of the present invention.

FIG. 9 is a flowchart illustrating a method of initializing an AVS inverse quantization table according to an embodiment of the present invention. In accordance with the AVS coding standard, a weight quant matrix can be obtained from decoding a picture header, and each of a de-quant table and a shift table is a pre-defined table known beforehand. If the AVS syntax decoding is currently performed at the picture header, the weight quant matrix is decoded (steps 902 and 904). If the AVS syntax decoding is not currently performed at the picture header, steps 906 and 908 are performed to load the decoded weight quant matrix and the pre-defined de-quant table and shift table into the inverse quantization process memory 802.

Figure 10:
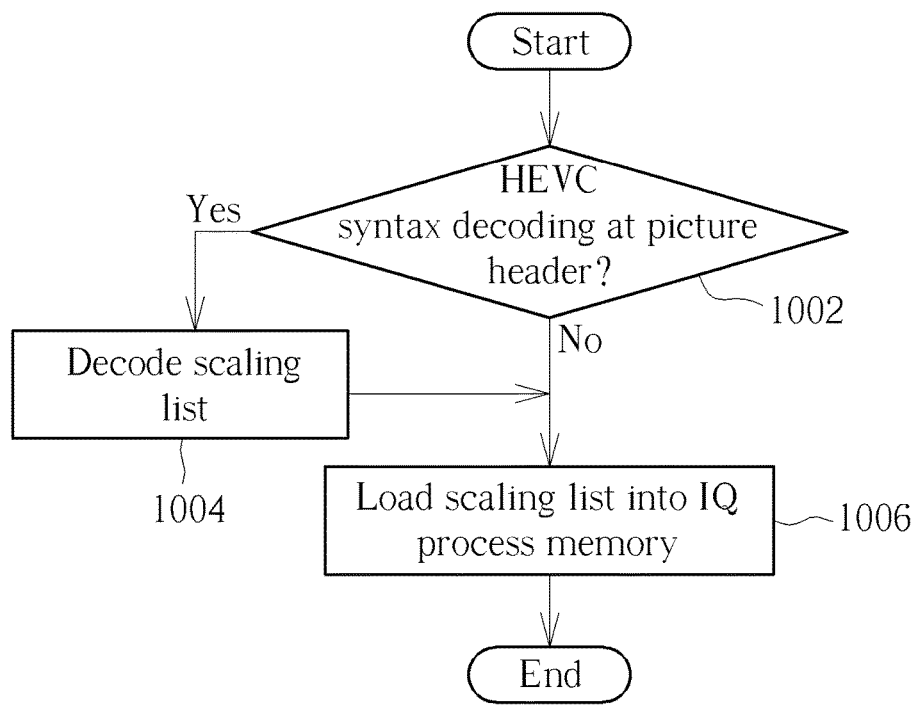
FIG. 10 is a flowchart illustrating a method of initializing an HEVC inverse quantization table according to an embodiment of the present invention.

FIG. 10 is a flowchart illustrating a method of initializing an HEVC inverse quantization table according to an embodiment of the present invention. In accordance with the HEVC coding standard, a scaling list can be obtained from decoding a picture header. If the HEVC syntax decoding is currently performed at the picture header, the scaling list is decoded (steps 1002 and 1004). If the HEVC syntax decoding is not currently performed at the picture header, step 1006 is performed to load the decoded scaling list into the inverse quantization process memory 802.

As mentioned above, the CPU 830 records decoding information in the control register 832. In this embodiment, the decoding information recorded in the control register 832 provides a control setting hevc/avs_ctrl to the specification controller 803, and further provides the control setting hevc/avs_ctrl to another specification controller 834. The control setting hevc/avs_ctrl controls the specification controller 803 to allow one of HEVC inverse quantization circuit 810 and AVS inverse quantization circuit 820 to perform data access upon the shared storage device (e.g., inverse quantization process memory 802), and controls the specification controller 834 to allow one of HEVC inverse quantization circuit 810 and AVS inverse quantization circuit 820 to output inverse-quantized transform coefficients to a post stage (e.g., an inverse transform stage). Moreover, the decoding information recorded in the control register 832 further provides control settings to HEVC inverse quantization circuit 810 (particularly, HEVC multiplier parameter generator 818 and HEVC quantization multiplier 812) and AVS inverse quantization circuit 820 (particularly, AVS multiplier parameter generator 828 and AVS quantization multiplier 822).

Consider a case where a current video coding standard being processed for one pixel data set (which may correspond to one picture if a picture level source change process is employed, or may correspond to one slice if a slice level source change process is employed, or may correspond to one MB (or LCU/CU) if an MB (or LCU/CU) level source change process is employed) is the HEVC coding standard. The specification controller 803 grants an access right of the inverse quantization process memory 802 to the HEVC inverse quantization circuit 810. The special-remapping result (e.g., inverse-scanned quantized transform coefficients of residual) generated from the spatial-remapping processor 801 is fed into the HEVC quantization multiplier 812. By way of example, but not limitation, the spatial-remapping processor 801 may be implemented using the proposed spatial-remapping processor architecture shown in FIG. 5 or FIG. 6.

The HEVC address generator 816 determines memory addresses of the inverse quantization process memory 802 for HEVC band-remapping. The HEVC multiplier parameter generator 818 refers to the memory addresses determined by the HEVC address generator 816 to read HEVC multiplier parameters from an HEVC inverse quantization table (e.g., a scaling list) loaded in the inverse quantization process memory 802, and supplies the HEVC multiplier parameters to the HEVC quantization multiplier 812. The HEVC quantization multiplier 812 multiplies the HEVC multiplier parameters provided by the HEVC multiplier parameter generator 818 and the special-remapping result (e.g., inverse-scanned quantized transform coefficients of residual) to thereby generate an HEVC inverse quantization result (e.g., inverse-quantized transform coefficients of residual), and output the HEVC inverse quantization result to a post stage (e.g., an HEVC inverse transform stage) via the specification controller 834.

Consider another case where a current video coding standard being processed for one pixel data set (which may correspond to one picture if a picture level source change process is employed, or may correspond to one slice if a slice level source change process is employed, or may correspond to one MB (or LCU/CU) if an MB (or LCU/CU) level source change process is employed) is the AVS coding standard. The specification controller 803 grants an access right of the inverse quantization process memory 802 to the AVS inverse quantization circuit 820. The special-remapping result (e.g., inverse-scanned quantized transform coefficients of residual) generated from the spatial-remapping processor 801 is fed into the AVS quantization multiplier 822. By way of example, but not limitation, the spatial-remapping processor 801 may be implemented using the proposed spatial-remapping processor architecture shown in FIG. 5 or FIG. 6.

The AVS address generator 826 determines memory addresses of the inverse quantization process memory 802 for AVS band-remapping. The AVS multiplier parameter generator 828 refers to the memory addresses determined by the AVS address generator 826 to read AVS multiplier parameters from an AVS inverse quantization table (e.g., a weight quant matrix, a de-quant table and/or a shift table) loaded in the inverse quantization process memory 802, and supplies the AVS multiplier parameters to the AVS quantization multiplier 822. The AVS quantization multiplier 822 multiplies the AVS multiplier parameters provided by the AVS multiplier parameter generator 828 and the special-remapping result (e.g., inverse-scanned quantized transform coefficients of residual) to thereby generate an AVS inverse quantization result (e.g., inverse-quantized transform coefficients of residual), and output the AVS inverse quantization result to a post stage (e.g., an AVS inverse transform stage) via the specification controller 834.

Figure 11:
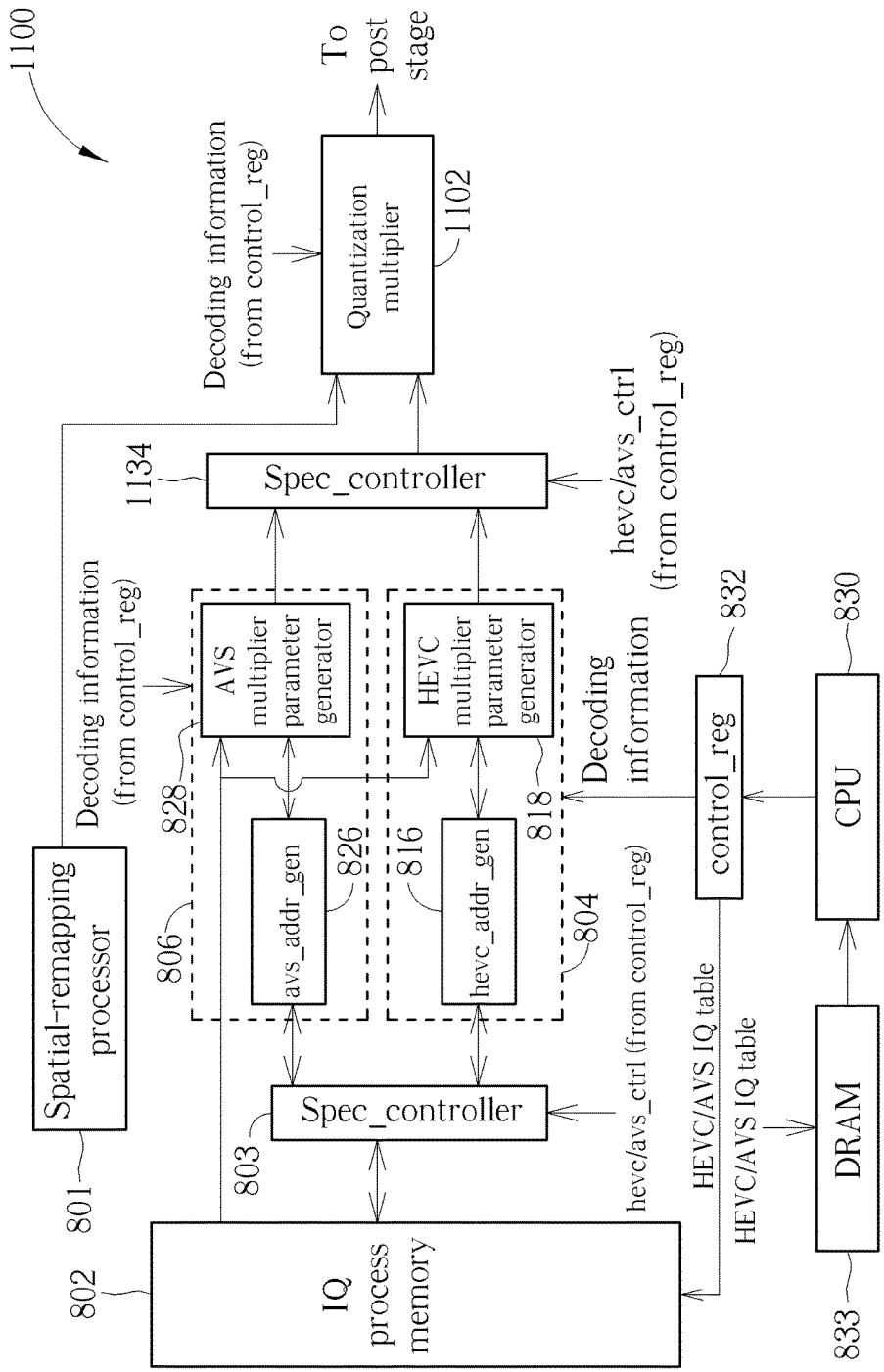
FIG. 11 is a diagram illustrating a video decoder with second proposed architecture of multi-standard spatial-remapping process according to an embodiment of the present invention.

With regard to the video decoder design shown in FIG. 8, the HEVC inverse quantization circuit 810 has one dedicated quantization multiplier 812, and the AVS inverse quantization circuit 820 has one dedicated quantization multiplier 822. Alternatively, a hardware sharing technique may be employed for hardware cost reduction. FIG. 11 is a diagram illustrating a video decoder with second proposed architecture of multi-standard spatial-remapping process according to an embodiment of the present invention. The major difference between video decoders 800 and 1100 is that the video decoder 1100 includes a quantization multiplier 1102 being a shared processing circuit for different video coding standards (e.g., HEVC and AVS).

In this embodiment shown in FIG. 11, the specification controller 1104 is controlled to output a first data read from a shared storage device (e.g., HEVC multiplier parameters read from the inverse quantization process memory 802) to the quantization multiplier 1102 when a current video coding standard being processed is the HEVC coding standard, and is controlled to output a second data read from the shared storage device (e.g., AVS multiplier parameters read from the inverse quantization process memory 802) to the quantization multiplier 1102 when a current video coding standard being processed is the AVS coding standard. Hence, the quantization multiplier 1102 is arranged to process the first data read from the shared storage device (e.g., HEVC multiplier parameters read from the inverse quantization process memory 802), and is further arranged to process the second data read from the shared storage device (e.g., AVS multiplier parameters read from the inverse quantization process memory 802).

Figure 12:
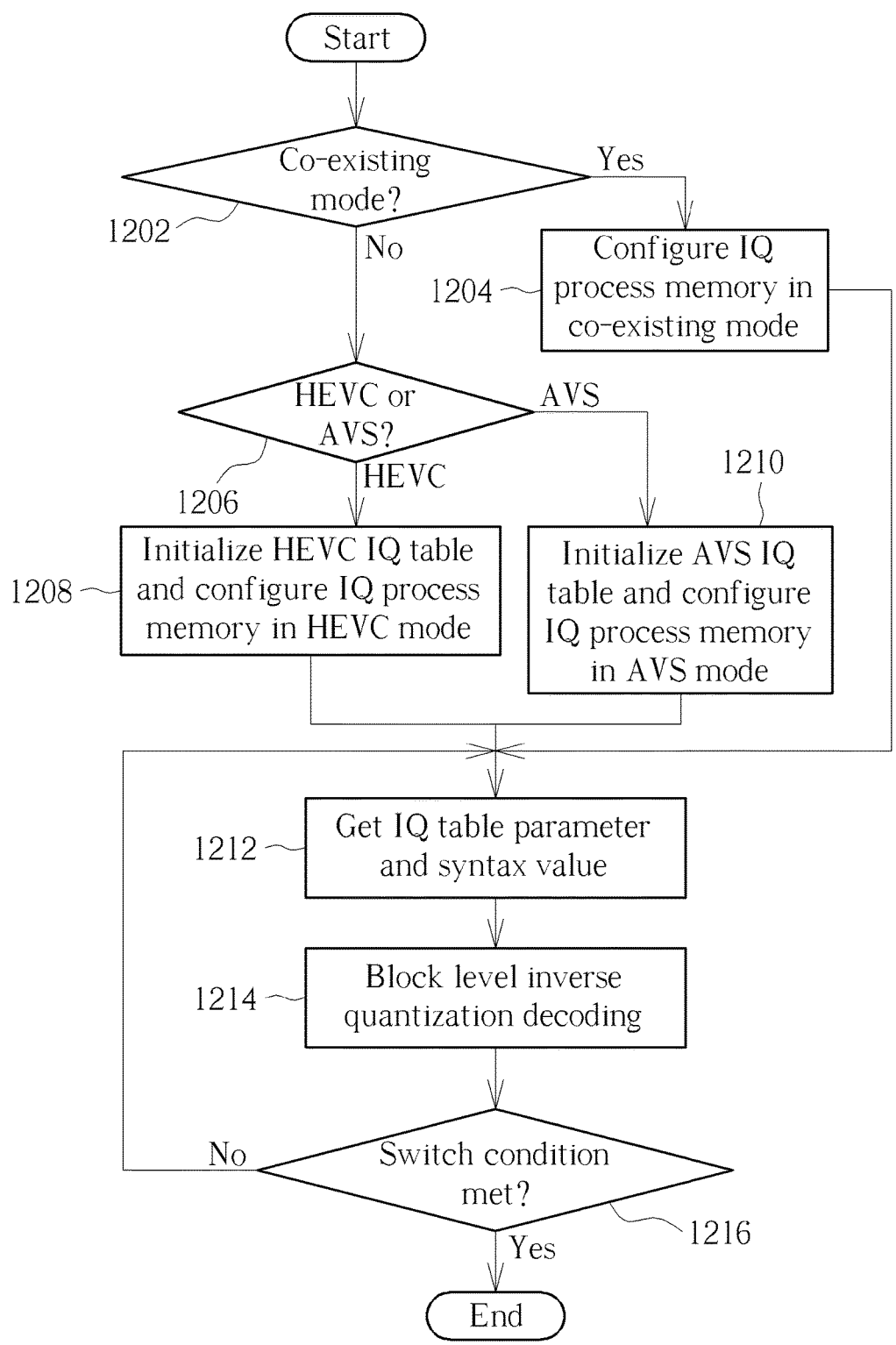
FIG. 12 is a flowchart illustrating a band-remapping decoding method applied to a source change process according to an embodiment of the present invention.

FIG. 12 is a flowchart illustrating a band-remapping decoding method applied to a source change process according to an embodiment of the present invention. Provided that the result is substantially the same, the steps are not required to be executed in the exact order shown in FIG. 12. For clarity and simplicity, it is assumed that the source change process is configured to switch between decoding operations of two different video coding standards such as the HEVC coding standard and the AVS coding standard. In step 1202, the CPU 830 checks if the inverse quantization process memory 802 is instructed to be configured in a co-existing mode. When the HEVC inverse quantization table and the AVS inverse quantization table are arranged to co-exist in the inverse quantization process memory 802, the CPU 830 configures the inverse quantization process memory 802 for allowing the HEVC inverse quantization table and the AVS inverse quantization table to be both loaded into the inverse quantization process memory 802 (step 1204). When the HEVC inverse quantization table and the AVS inverse quantization table are arranged to be dynamically loaded from the DRAM 833 to the IQ process memory 802 by the CPU 830, the flow proceeds with step 1206.

In step 1206, the CPU 830 determines whether a current video coding standard being processed is the HEVC coding standard or the AVS coding standard. When the current video coding standard being processed is the HEVC coding standard, the flow proceeds with step 1208 to configure the inverse quantization process memory 802 in an HEVC mode. When the current video coding standard being processed is the AVS coding standard, the flow proceeds with step 1210 to configure the inverse quantization process memory 802 in an AVS mode. The inverse quantization process memory 802 is shared by HEVC inverse quantization function and AVS inverse quantization function, and can be configured using a cost-efficiency arrangement or a power-efficiency arrangement. Further details of the cost-efficiency arrangement and the power-efficiency arrangement of a shared storage device are described later.

After the inverse quantization process memory 802 is properly configured for a dynamically-loading mode (step 1208/1210) or properly configured for a co-existing mode (step 1204), step 1212 is performed to get multiplier parameters read from the inverse quantization table loaded in the inverse quantization process memory 802 and syntax values (e.g., inverse-scanned quantized transform coefficients of residual) generated from the spatial-remapping processor 801. In step 1214, a block level inverse quantization decoding operation is performed to apply the selected multiplier parameters to syntax values (e.g., inverse-scanned quantized transform coefficients of residual) of each block. In step 1216, the CPU 530 checks if a switch condition of the source change process is met. For example, when a picture level source change process is employed, the switch condition of the source change process is met if a block level inverse quantization decoding operation has been applied to all macroblocks in a picture. For another example, when a slice level source change process is employed, the switch condition of the source change process is met if a block level inverse quantization decoding operation has been applied to all macroblocks in a slice. For yet another example, when an MB (or LCU/CU) level source change process is employed, the switch condition of the source change process is met if a block level inverse quantization decoding operation has been applied to one macroblock (or all macroblocks in an LCU/CU).

With regard to a video encoder, it performs several encoding functions, including transform, quantization, scan, entropy encoding, etc. The same proposed storage sharing technique applied to one or both of a spatial-remapping processor (e.g., inverse scan circuit) and a band-remapping processor (e.g., inverse quantization circuit) of a video decoder can also be applied to one or both of a spatial-remapping processor (e.g., scan circuit) and a band-remapping processor (e.g., quantization circuit) of a video encoder.

Figure 13:
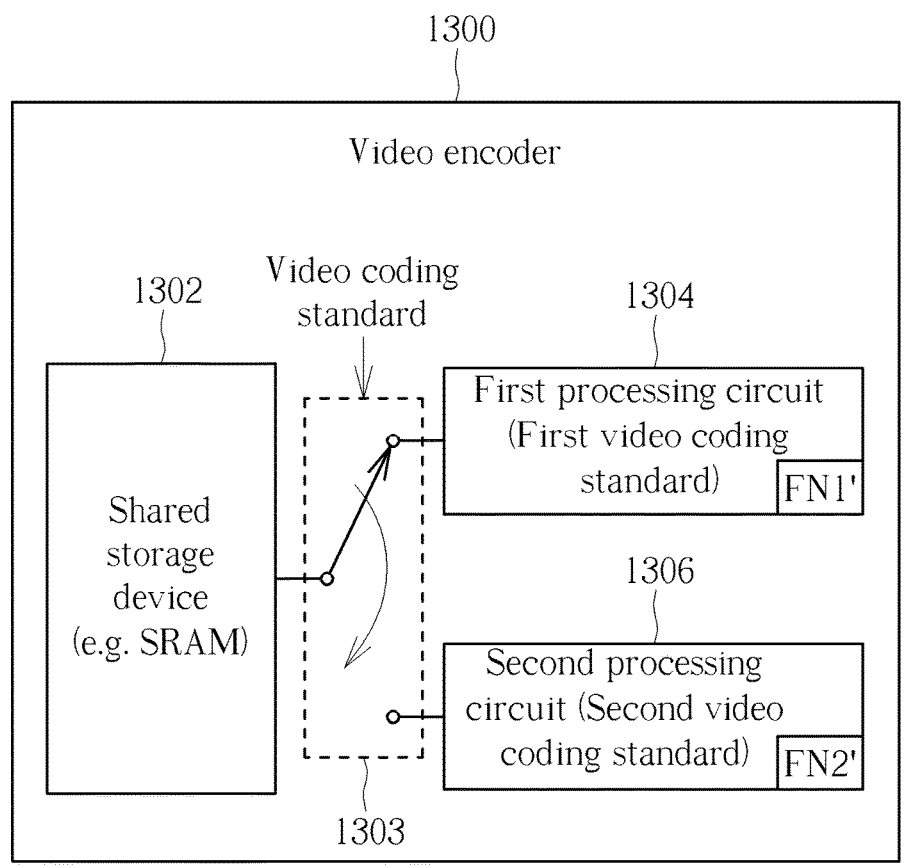
FIG. 13 is a diagram illustrating a video encoder using a proposed storage sharing technique according to an embodiment of the present invention.

FIG. 13 is a diagram illustrating a video encoder using a proposed storage sharing technique according to an embodiment of the present invention. Like the video decoder 400 shown in FIG. 4, the video encoder 1300 shown in FIG. 13 includes a shared storage device 1302, a control circuit 1303, a first processing circuit 1304, and a second processing circuit 1306. It should be noted that only the circuit components pertinent to the present invention are shown in FIG. 13. In practice, the video encoder 1300 further includes other circuit components for achieving the complete encoding functionality. The shared storage device 1302 is accessible to the first processing circuit 1304 and the second processing circuit 1306 via the control circuit 1303. For example, the shared storage device 1302 may be implemented using a memory device such as a static random access memory (SRAM), and the control circuit 1303 may be implemented using a switch device controlled based on a current video coding standard being processed. The first processing circuit 1304 is arranged to perform a first encoding operation FN1' according to data access of the shared storage device 1302 when the shared storage device 1302 is accessible to the first processing circuit 1304. The second processing circuit 1306 is arranged to perform a second encoding operation FN2' according to data access of the shared storage device 1302 when the shared storage device 1302 is accessible to the second processing circuit 1306. The first encoding operation FN1' is at least a portion (i.e., part or all) of a first encoding function complying with a first video coding standard, and the second encoding operation FN2' is at least a portion (i.e., part or all) of a second encoding function complying with a second video coding standard different from the first video coding standard. In one exemplary design, one of the first video coding standard and the second video coding standard may be an AVS coding standard, and the other of the first video coding standard and the second video coding standard may be an HEVC coding standard. However, this is for illustrative purposes only, and is not meant to be a limitation of the present invention. For example, the first video coding standard and the second video coding standard may be selected from various video coding standards, including HEVC, AVS, H.264/AVC (Advanced Video Coding), AVS2, etc.

As shown in FIG. 13, when the current video coding standard being processed is switched from the second video coding standard to the first video coding standard due to the aforementioned picture level/slice level/MB (or LCU/CU) level source change process, the control circuit 1303 is operative to connect the shared storage device 1302 and the first processing circuit 1304, thus allowing the first processing circuit 1304 to use the shared storage device 402 to complete the first encoding operation FN1' for one picture/slice/MB (or LCU/CU). When the current video coding standard being processed is switched from the first video coding standard to the second video coding standard due to the aforementioned picture level/slice level/MB (or LCU/CU) level source change process, the control circuit 1303 is operative to connect the shared storage device 1302 and the second processing circuit 1306, thus allowing the second processing circuit 1306 to use the shared storage device 1302 to complete the second encoding operation FN2' for one picture/slice/MB (or LCU/CU). By way of example, but not limitation, the first encoding function and the second encoding function are the same encoding function, such as a spatial-remapping function (e.g., scan function) or a band-remapping function (e.g., quantization function). For better understanding of technical features of the present invention, several exemplary video encoder designs are discussed as below.

Figure 14:
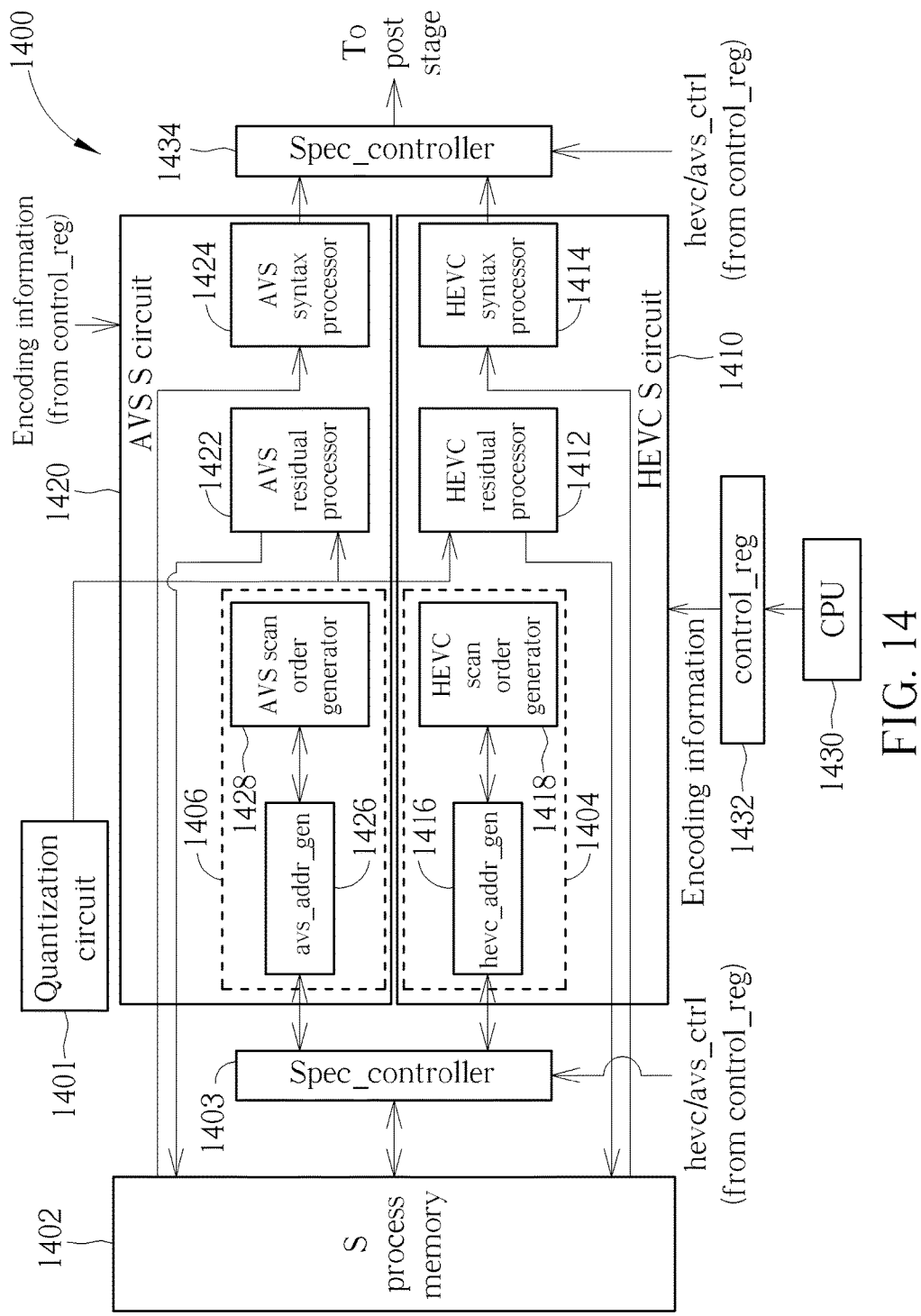
FIG. 14 is a diagram illustrating a video encoder with first proposed architecture of multi-standard spatial-remapping process according to an embodiment of the present invention.

FIG. 14 is a diagram illustrating a video encoder with first proposed architecture of multi-standard spatial-remapping process according to an embodiment of the present invention. For clarity and simplicity, it is assumed that the first video coding standard is the HEVC coding standard, and the second video coding standard is the AVS coding standard. The video encoder 1400 employs the exemplary architecture shown in FIG. 13. As shown in FIG. 14, the video encoder 1400 includes a scan (S) process memory 1402 acting as the shared storage device 1302 in FIG. 13, a specification controller (denoted by spec_controller) 1403 acting as the control circuit 1303 in FIG. 13, an HEVC scan order processing circuit 1404 acting as the first processing circuit 1304 in FIG. 13, and an AVS scan order processing circuit 1406 acting as the second processing circuit 1306 in FIG. 13. The HEVC scan order processing circuit 1404 includes an HEVC address generator (denoted by hevc_addr_gen) 1416 and an HEVC scan order generator 1418. The AVS scan order processing circuit 1406 includes an AVS address generator (denoted by avs_addr_gen) 1426 and an AVS scan order generator 1428. In this embodiment, an HEVC scan circuit 1410 further includes an HEVC residual processor 1412 and an HEVC syntax processor 1414, and an AVS scan circuit 1420 further includes an AVS residual processor 1422 and an AVS syntax processor 1424.

A CPU 1430 is arranged to determine a current video coding standard being processed according to a source change process, and write encoding information into a control register (denoted by control_reg) 1432 correspondingly. The encoding information recorded in the control register 1432 provides a control setting hevc/avs_ctrl to the specification controller 1403, and further provides the control setting hevc/avs_ctrl to another specification controller 1434. The control setting hevc/avs_ctrl controls the specification controller 1403 to allow one of HEVC scan circuit 1410 and AVS scan circuit 1420 to perform data access upon a shared storage device (e.g., scan process memory 1402), and controls the specification controller 1434 to allow one of HEVC scan circuit 1410 and AVS scan circuit 1420 to output scanned quantized transform coefficients to a post stage (e.g., an entropy encoding stage). Moreover, the encoding information recorded in the control register 1432 further provides control settings to HEVC scan circuit 1410 (particularly, HEVC scan order generator 1418, HEVC syntax processor 1414, and HEVC residual processor 1412) and AVS scan circuit 1420 (particularly, AVS scan order generator 1428, AVS syntax processor 1424, and AVS residual processor 1422).

Consider a case where a current video coding standard being processed for one pixel data set (which may correspond to one picture if a picture level source change process is employed, or may correspond to one slice if a slice level source change process is employed, or may correspond to one MB (or LCU/CU) if an MB (or LCU/CU) level source change process is employed) is the HEVC coding standard. The specification controller 1403 grants an access right of the scan process memory 1402 to the HEVC scan circuit 1410. The quantization values (e.g., quantized transform coefficients of residual) generated from the quantization circuit 1401 are processed and buffered by the HEVC residual processor 1412, and the HEVC residual processor 1412 outputs the buffered quantization values (e.g., quantized transform coefficients of residual) to the scan process memory 1402. The HEVC scan order generator 1418 generates an HEVC scan order according to the encoding information and an HEVC scan table. The HEVC address generator 1416 refers to the HEVC scan order to determine memory addresses of the scan process memory 1402 for HEVC spatial-remapping. That is, quantized transform coefficients sequentially stored into the scan process memory 502 are read according to the memory addresses configured in a scan order. The HEVC syntax processor 1414 receives HEVC scan data (e.g., scanned quantized transform coefficients) read from the scan process memory 1402 according to the memory addresses generated by the HEVC address generator 1416, processes and buffers the HEVC scan data, and outputs the buffered HEVC scan data to a post stage (e.g., an HEVC entropy encoding stage) via the specification controller 1434.

Consider another case where a current video coding standard being processed for one pixel data set (which may correspond to one picture if a picture level source change process is employed, or may correspond to one slice if a slice level source change process is employed, or may correspond to one MB (or LCU/CU) if an MB (or LCU/CU) level source change process is employed) is the AVS coding standard. The specification controller 1403 grants an access right of the scan process memory 1402 to the AVS scan circuit 1420. The quantization values (e.g., quantized transform coefficients of residual) generated from the quantization circuit 1401 are processed and buffered by the AVS residual processor 1422, and the AVS residual processor 1422 outputs the buffered quantization values (e.g., quantized transform coefficients of residual) to the scan process memory 1402. The AVS scan order generator 1428 generates an AVS scan order according to the encoding information and an AVS scan table (e.g., weight quant matrix, de-quant table and/or shift table). The AVS address generator 1426 refers to the AVS scan order to determine memory addresses of the scan process memory 1402 for AVS spatial-remapping. That is, quantized transform coefficients sequentially stored into the scan process memory 1402 are read according to the memory addresses configured in a scan order. The AVS syntax processor 1424 receives AVS scan data (e.g., scanned quantized transform coefficients) read from the scan process memory 1402 according to the memory addresses generated by the AVS address generator 1426, processes and buffers the AVS scan data, and outputs the buffered AVS scan data to a post stage (e.g., an AVS entropy encoding stage) via the specification controller 1434.

Figure 15:
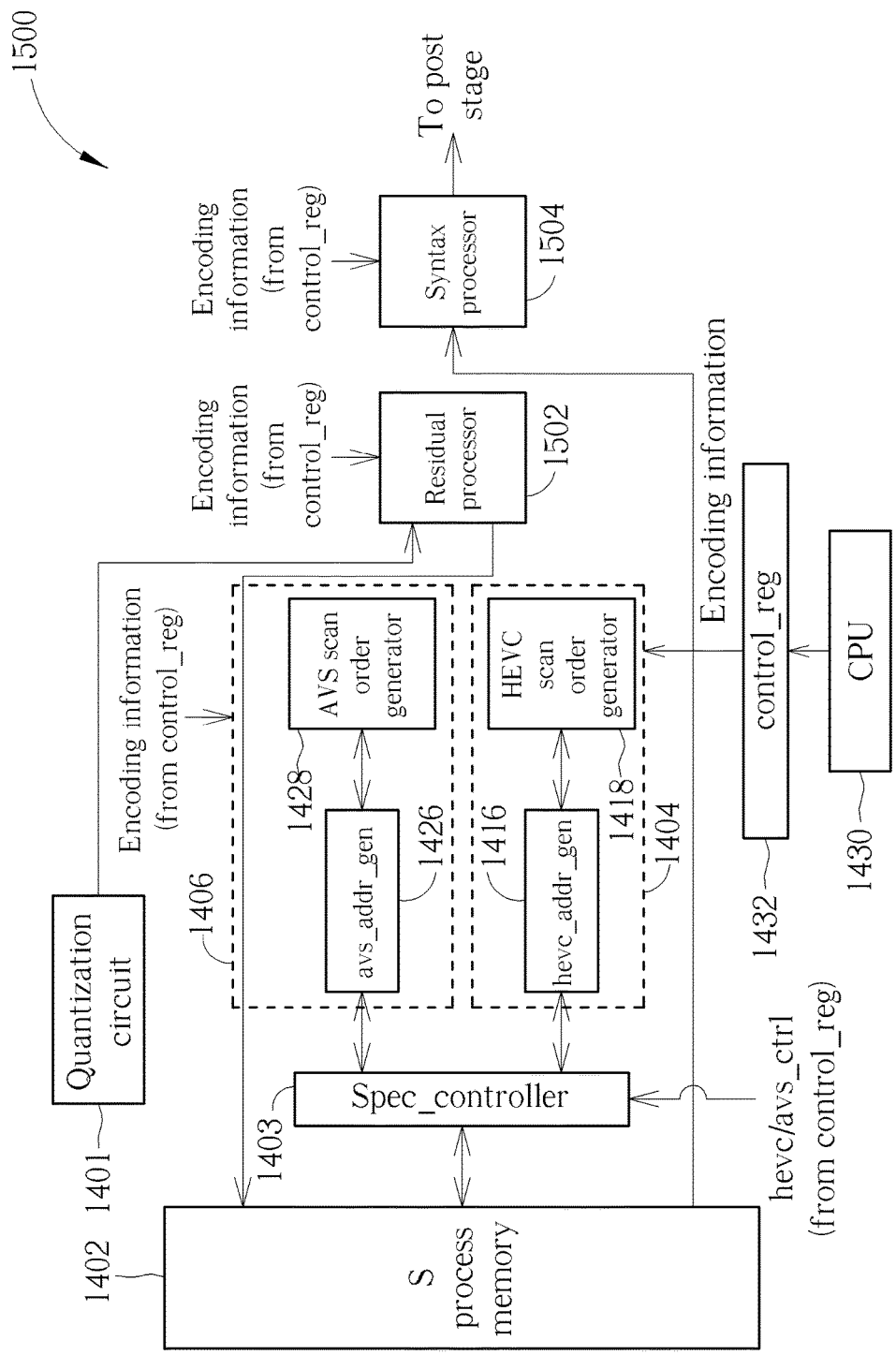
FIG. 15 is a diagram illustrating a video encoder with second proposed architecture of multi-standard spatial-remapping process according to an embodiment of the present invention.

With regard to the video encoder design shown in FIG. 14, the HEVC scan circuit 1410 has one dedicated syntax processor 1424 and one dedicated residual processor 1412, and the AVS scan circuit 1420 has one dedicated syntax processor 1424 and one dedicated residual processor 1422. Alternatively, a hardware sharing technique may be employed for hardware cost reduction. FIG. 15 is a diagram illustrating a video encoder with second proposed architecture of multi-standard spatial-remapping process according to an embodiment of the present invention. The major difference between video encoders 1400 and 1500 is that the video encoder 1500 includes a residual processor 1502 being a shared processing circuit for different video coding standards (e.g., HEVC and AVS), and further includes a syntax processor 1504 being a shared processing circuit for different video coding standards (e.g., HEVC and AVS).

With regard to the residual processor 1502, it is arranged to process and buffer a first data to be stored into a shared storage device (e.g., HEVC quantization result generated from the quantization circuit 1401 to the scan process memory 1402), and is further arranged to process and buffer a second data to be stored into the shared storage device (e.g., AVS quantization result generated from the quantization circuit 1401 to the scan process memory 1402), where the first data stored in the shared storage device is accessed by a first processing circuit (e.g., HEVC scan order processing circuit 1404), and the second data stored in the shared storage device is accessed by a second processing circuit (e.g., AVS scan order processing circuit 1406). With regard to the syntax processor 1504, it is arranged to process and buffer the first data retrieved from the shared storage device by the first processing circuit, and output the buffered first data to a post stage (e.g., HEVC entropy encoding stage), and is further arranged to process and buffer the second data retrieved from the shared storage device by the second processing circuit, and output the buffered second data to a post stage (e.g., AVS entropy encoding stage).

Figure 16:
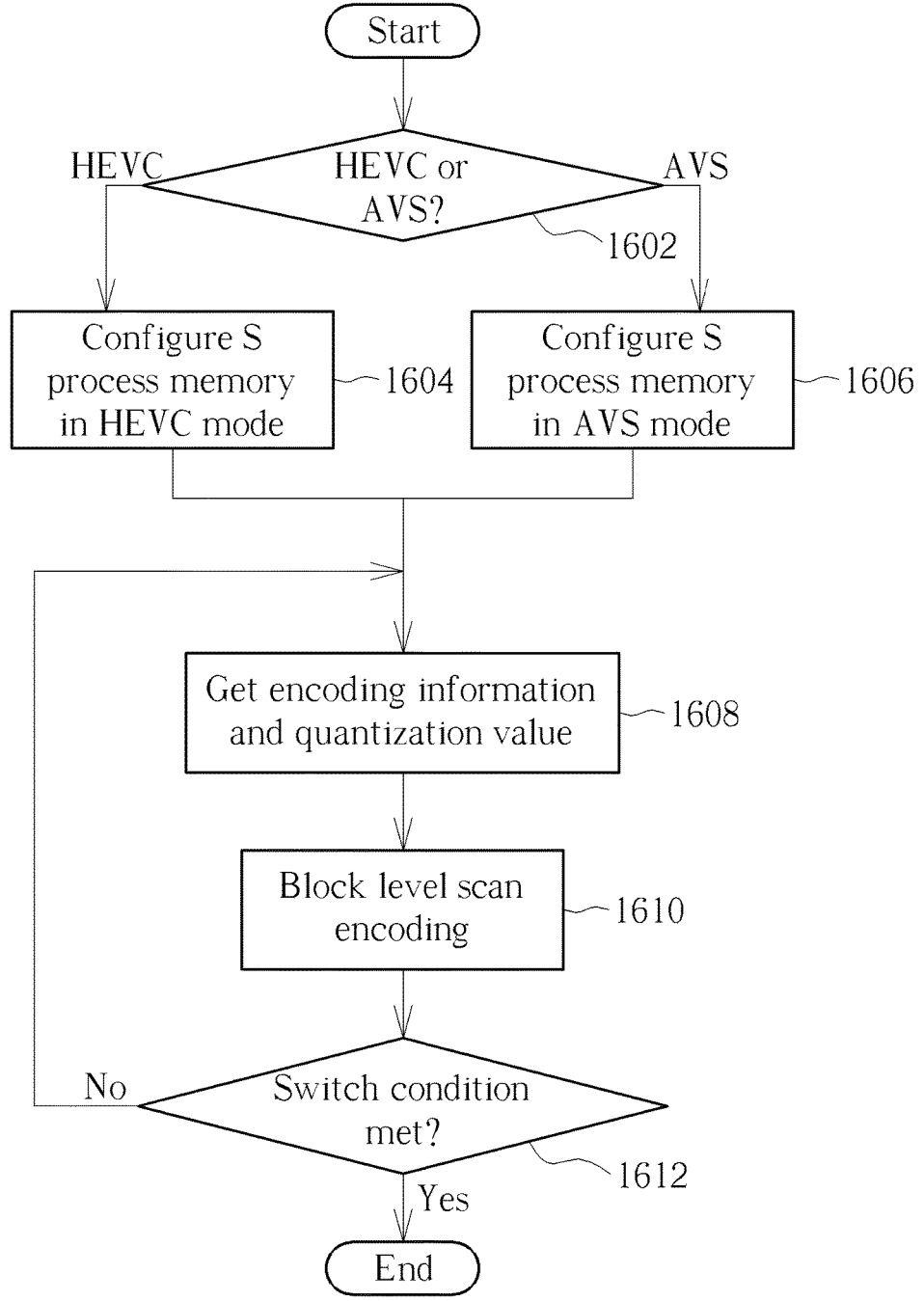
FIG. 16 is a flowchart illustrating a spatial-remapping encoding method applied to a source change process according to an embodiment of the present invention.

FIG. 16 is a flowchart illustrating a spatial-remapping encoding method applied to a source change process according to an embodiment of the present invention. Provided that the result is substantially the same, the steps are not required to be executed in the exact order shown in FIG. 16. For clarity and simplicity, it is assumed that the source change process is configured to switch between encoding operations of two different video coding standards such as the HEVC coding standard and the AVS coding standard. In step 1602, the CPU 1430 determines whether a current video coding standard being processed is the HEVC coding standard or the AVS coding standard. When the current video coding standard being processed is the HEVC coding standard, the flow proceeds with step 1604 to configure the scan process memory 1402 in an HEVC mode. When the current video coding standard being processed is the AVS coding standard, the flow proceeds with step 1606 to configure the scan process memory 1402 in an AVS mode. The scan process memory 1402 is shared by HEVC scan function and AVS scan function, and can be configured using a cost-efficiency arrangement or a power-efficiency arrangement. Further details of the cost-efficiency arrangement and the power-efficiency arrangement of a shared storage device are described later.

After the scan process memory 1402 is properly configured for the current video coding standard being processed, step 1608 is performed to get the encoding information from the control register 1432 set by the CPU 1430 and quantization values (e.g., quantized transform coefficients of residual) generated from the quantization circuit 1401. In step 1610, a block level scan encoding operation is performed to read quantization values (e.g., quantized transform coefficients of residual) of each block from the scan process memory 1402 according to a scan order. In step 1612, the CPU 1430 checks if a switch condition of the source change process is met. For example, when a picture level source change process is employed, the switch condition of the source change process is met if a block level scan encoding operation has been applied to all macroblocks in a picture. For another example, when a slice level source change process is employed, the switch condition of the source change process is met if a block level scan encoding operation has been applied to all macroblocks in a slice. For yet another example, when an MB (or LCU/CU) level source change process is employed, the switch condition of the source change process is met if a block level scan encoding operation has been applied to one macroblock (or all macroblocks in an LCU/CU).

Figure 17:
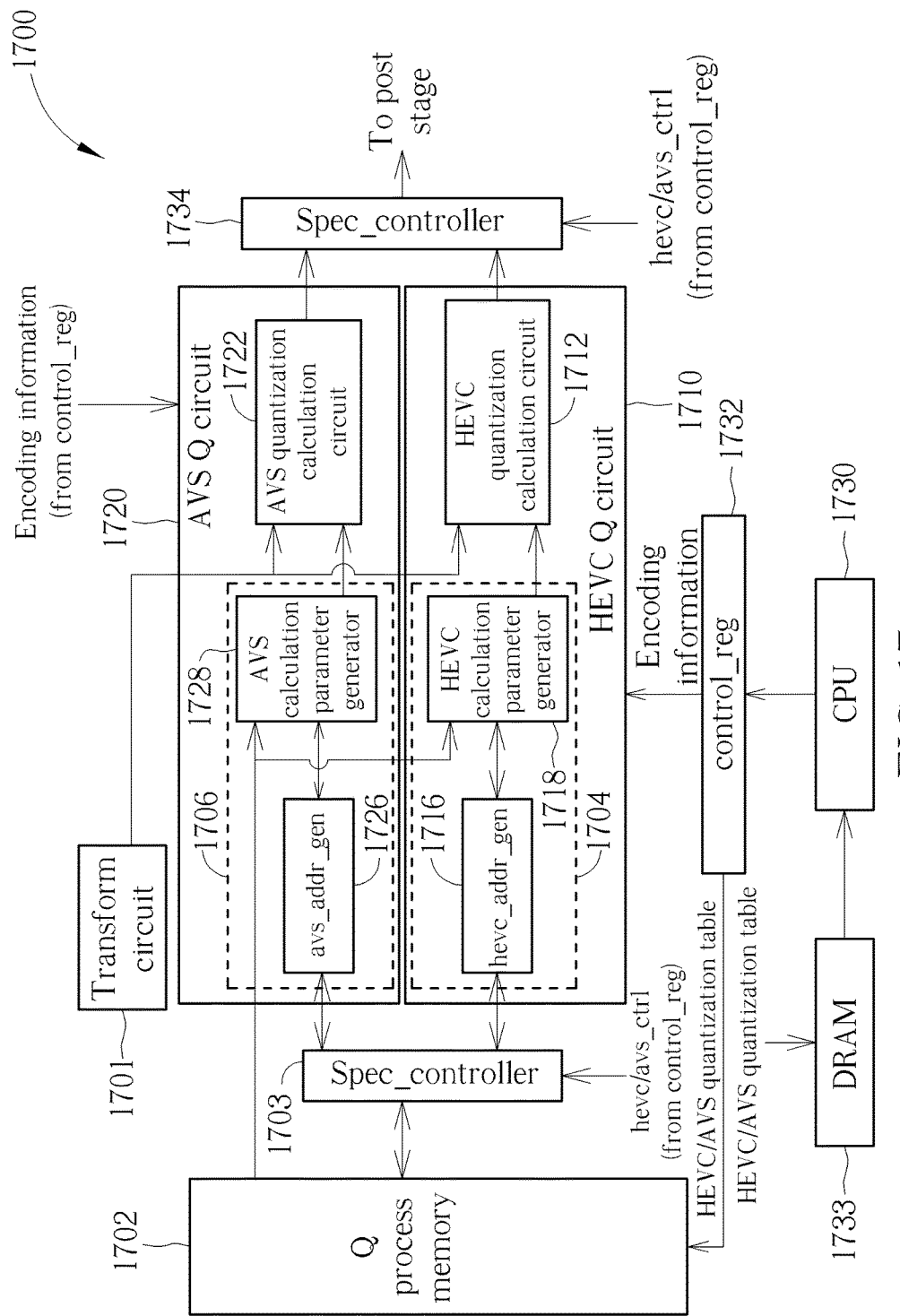
FIG. 17 is a diagram illustrating a video encoder with first proposed architecture of multi-standard band-remapping process according to an embodiment of the present invention.

FIG. 17 is a diagram illustrating a video encoder with first proposed architecture of multi-standard band-remapping process according to an embodiment of the present invention. For clarity and simplicity, it is assumed that the first video coding standard is the HEVC coding standard, and the second video coding standard is the AVS coding standard. The video encoder 1700 employs the exemplary architecture shown in FIG. 13. As shown in FIG. 17, the video encoder 1700 includes a quantization (Q) process memory 1702 acting as the shared storage device 1302 in FIG. 13, a specification controller (denoted by spec_controller) 1703 acting as the control circuit 1303 in FIG. 13, an HEVC quantization parameter processing circuit 1704 acting as the first processing circuit 1304 in FIG. 13, and an AVS quantization parameter processing circuit 1706 acting as the second processing circuit 1306 in FIG. 13. The HEVC quantization parameter processing circuit 1704 includes an HEVC address generator (denoted by hevc_addr_gen) 1716 and an HEVC calculation parameter generator 1718. The AVS quantization parameter processing circuit 1706 includes an AVS address generator (denoted by avs_addr_gen) 1726 and an AVS calculation parameter generator 1728. In this embodiment, an HEVC quantization circuit 1710 further includes an HEVC quantization calculation circuit 1712, and an AVS quantization circuit 1720 further includes an AVS quantization calculation circuit 1722.

A CPU 1730 is arranged to determine a current video coding standard being processed according to a source change process, and write encoding information into a control register (denoted by control_reg) 1732 correspondingly. A quantization table of each video coding standard may be obtained/created and then stored in a dynamic random access memory (DRAM) 1733. For example, a quantization table of the HEVC coding standard may include a scaling list, and a quantization table of the AVS coding standard may include a weight quant matrix, a de-quant table and/or a shift table. In a first exemplary design where a quantization table of a current video coding standard being processed is loaded into the quantization process memory 1702 on demand, an HEVC quantization table is read from the DRAM 1733 and loaded into the quantization process memory 1702 each time the current video coding standard being processed is switched to the HEVC coding standard, and an AVS quantization table is read from the DRAM 1733 and loaded into the quantization process memory 1702 each time the current video coding standard being processed is switched to the AVS coding standard. In other words, the HEVC quantization table and the AVS quantization table do not co-exist in the quantization process memory 1702. In a second exemplary design where an HEVC quantization table and an AVS quantization table are both loaded into the quantization process memory 1702, the HEVC quantization table and the AVS quantization table therefore co-exist in the quantization process memory 1702.

In this embodiment, the encoding information recorded in the control register 1732 provides a control setting hevc/avs_ctrl to the specification controller 1703, and further provides the control setting hevc/avs_ctrl to another specification controller 1734. The control setting hevc/avs_ctrl controls the specification controller 1703 to allow one of HEVC quantization circuit 1710 and AVS quantization circuit 1720 to perform data access upon a shared storage device (e.g., quantization process memory 1702), and controls the specification controller 1734 to allow one of HEVC quantization circuit 1710 and AVS quantization circuit 1720 to output quantized transform coefficients to a post stage (e.g., a scan stage). Moreover, the encoding information recorded in the control register 1732 further provides control settings to HEVC quantization circuit 1710 (particularly, HEVC calculation parameter generator 1718 and HEVC quantization calculation circuit 1712) and AVS quantization circuit 1720 (particularly, AVS calculation parameter generator 1728 and AVS quantization calculation circuit 1722).

Consider a case where a current video coding standard being processed for one pixel data set (which may correspond to one picture if a picture level source change process is employed, or may correspond to one slice if a slice level source change process is employed, or may correspond to one MB (or LCU/CU) if an MB (or LCU/CU) level source change process is employed) is the HEVC coding standard. The specification controller 1703 grants an access right of the quantization process memory 1702 to the HEVC quantization circuit 1710. The transform result (e.g., transform coefficients of residual) generated from the transform circuit 1701 is fed into the HEVC quantization calculation circuit 1712.

The HEVC address generator 1716 determines memory addresses of the quantization process memory 1702 for HEVC band-remapping. The HEVC calculation parameter generator 1718 refers to the memory addresses determined by the HEVC address generator 1716 to read HEVC quantization calculation parameters from an HEVC quantization table (e.g., scaling list) loaded in the quantization process memory 1702, and supplies the HEVC quantization calculation parameters to the HEVC quantization calculation circuit 1712. The HEVC quantization calculation circuit 1712 quantizes the transform result (e.g., transform coefficients of residual) according to the HEVC quantization calculation parameters provided by the HEVC calculation parameter generator 1718 to thereby generate an HEVC quantization result (e.g., quantized transform coefficients of residual), and output the HEVC quantization result to a post stage (e.g., an HEVC scan stage) via the specification controller 834. By way of example, but not limitation, the HEVC scan stage may be part of a spatial-remapping processor implemented using the proposed spatial-remapping processor architecture shown in FIG. 14 or FIG. 15.

Consider another case where a current video coding standard being processed for one pixel data set (which may correspond to one picture if a picture level source change process is employed, or may correspond to one slice if a slice level source change process is employed, or may correspond to one MB (or LCU/CU) if an MB (or LCU/CU) level source change process is employed) is the AVS coding standard. The specification controller 1703 grants an access right of the quantization process memory 1702 to the AVS quantization circuit 1720. The transform result (e.g., transform coefficients of residual) generated from the transform circuit 1701 is fed into the AVS quantization calculation circuit 1722.

The AVS address generator 1726 determines memory addresses of the quantization process memory 1702 for AVS band-remapping. The AVS calculation parameter generator 1728 refers to the memory addresses determined by the AVS address generator 1726 to read AVS quantization calculation parameters from an AVS quantization table (e.g., a weight quant matrix, a de-quant table and/or a shift table) loaded in the quantization process memory 1702, and supplies the AVS quantization calculation parameters to the AVS quantization calculation circuit 1722. The AVS quantization calculation circuit 1722 quantizes the transform result (e.g., transform coefficients of residual) according to the AVS quantization calculation parameters provided by the AVS calculation parameter generator 1728 to thereby generate an AVS quantization result (e.g., quantized transform coefficients of residual), and output the AVS quantization result to a post stage (e.g., an AVS scan stage) via the specification controller 1734. By way of example, but not limitation, the AVS scan stage may be part of a spatial-remapping processor implemented using the proposed spatial-remapping processor architecture shown in FIG. 14 or FIG. 15.

Figure 18:
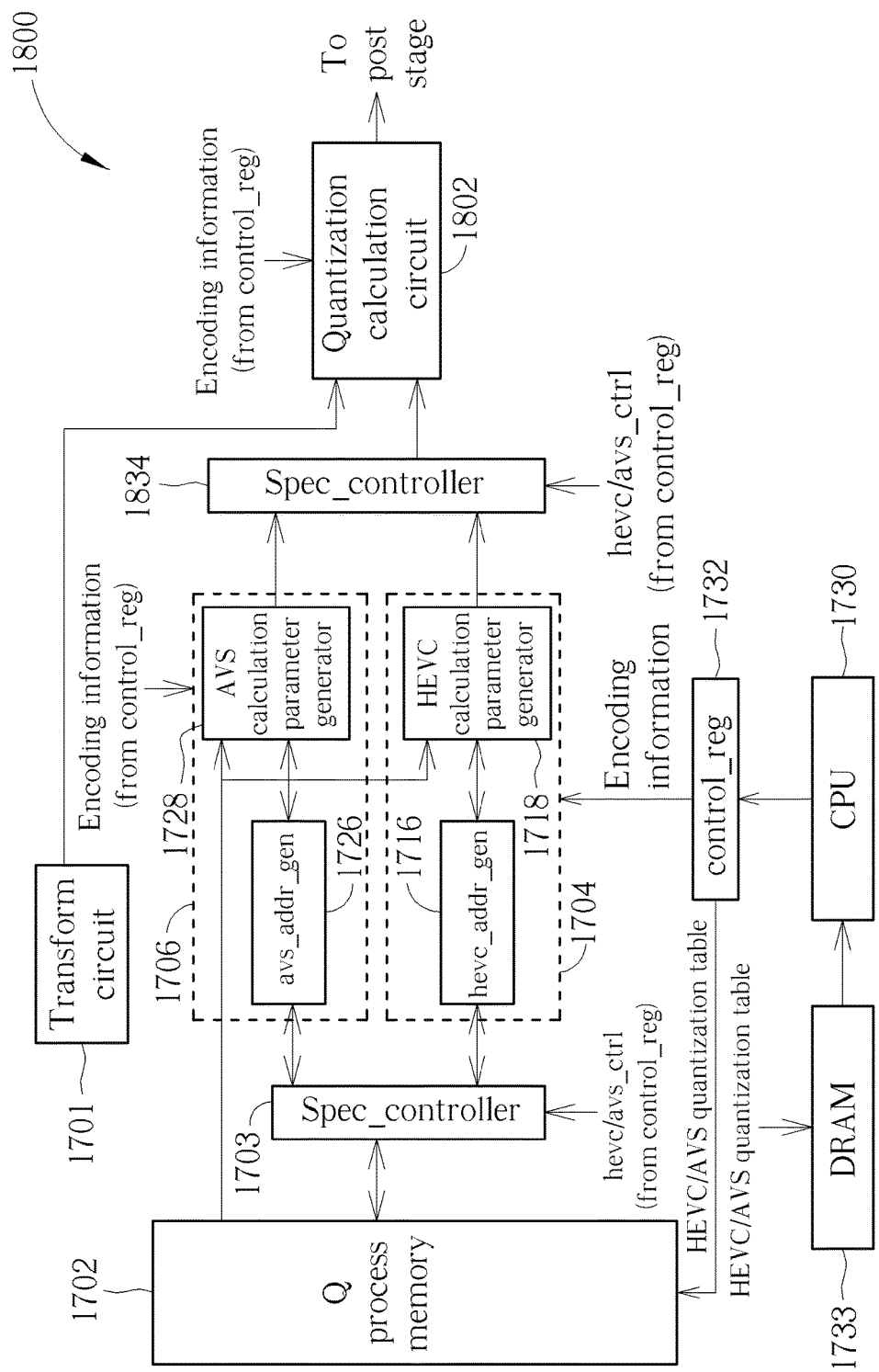
FIG. 18 is a diagram illustrating a video encoder with second proposed architecture of multi-standard spatial-remapping process according to an embodiment of the present invention.

With regard to the video encoder design shown in FIG. 17, the HEVC quantization circuit 1710 has one dedicated quantization calculation circuit 1712, and the AVS quantization circuit 1720 has one dedicated quantization calculation circuit 1722. Alternatively, a hardware sharing technique may be employed for hardware cost reduction. FIG. 18 is a diagram illustrating a video encoder with second proposed architecture of multi-standard spatial-remapping process according to an embodiment of the present invention. The major difference between video encoders 1700 and 1800 is that the video encoder 1800 includes a quantization calculation circuit 1802 being a shared processing circuit for different video coding standards (e.g., HEVC and AVS).

In this embodiment, a specification controller 1834 is controlled to output a first data read from a shared storage device (e.g., HEVC quantization calculation parameters read from the quantization process memory 1702) to the quantization calculation circuit 1802 when a current video coding standard being processed is the HEVC coding standard, and is controlled to output a second data read from the shared storage device (e.g., AVS quantization calculation parameters read from the quantization process memory 1702) to the quantization calculation circuit 1802 when a current video coding standard being processed is the AVS coding standard. Hence, the quantization calculation circuit 1802 is arranged to process the first data read from a shared storage device (e.g., HEVC quantization calculation parameters read from the quantization process memory 1702), and is further arranged to process the second data read from the shared storage device (e.g., AVS quantization calculation parameters read from the quantization process memory 1702).

Figure 19:
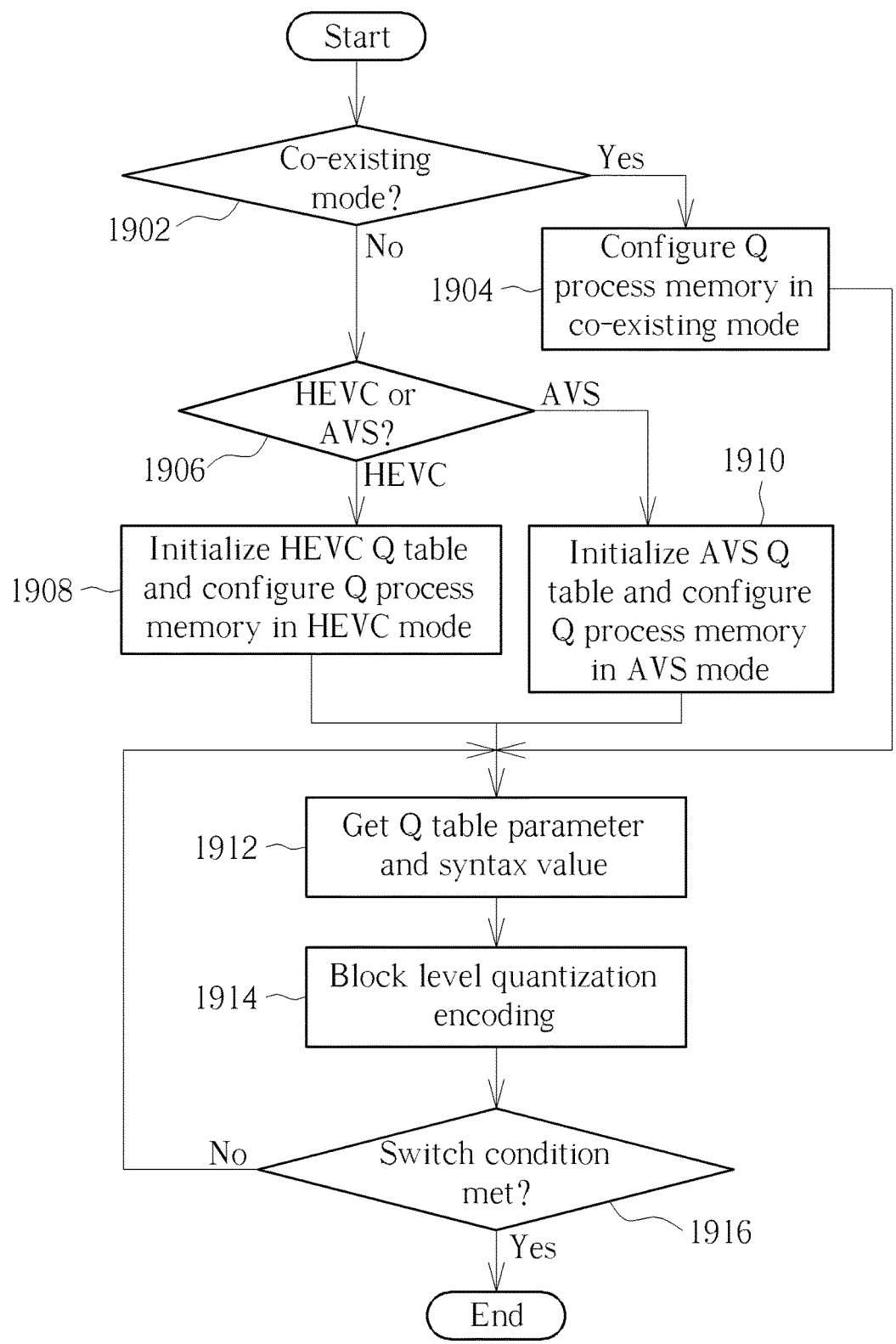
FIG. 19 is a flowchart illustrating a band-remapping encoding method applied to a source change process according to an embodiment of the present invention.

FIG. 19 is a flowchart illustrating a band-remapping encoding method applied to a source change process according to an embodiment of the present invention. Provided that the result is substantially the same, the steps are not required to be executed in the exact order shown in FIG. 19. For clarity and simplicity, it is assumed that the source change process is configured to switch between encoding operations of two different video coding standards such as the HEVC coding standard and the AVS coding standard. In step 1902, the CPU 1730 checks if the quantization process memory 1702 is instructed to be configured in a co-existing mode. When the HEVC quantization table and the AVS quantization table are arranged to co-exist in the quantization process memory 1702, the CPU 1730 configures the quantization process memory 1702 for allowing the HEVC quantization table and the AVS quantization table to be both loaded in the quantization process memory 1702 (step 1904). When the HEVC quantization table and the AVS quantization table are arranged to be dynamically loaded from the DRAM 1733 to the quantization process memory 1702 on demand, the flow proceeds with step 1906. In step 1906, the CPU 1730 determines whether a current video coding standard being processed is the HEVC coding standard or the AVS coding standard. When the current video coding standard being processed is the HEVC coding standard, the flow proceeds with step 1908 to configure the quantization process memory 1702 in an HEVC mode. When the current video coding standard being processed is the AVS coding standard, the flow proceeds with step 1910 to configure the quantization process memory 1702 in an AVS mode. The quantization process memory 1702 is shared by HEVC quantization function and AVS quantization function, and can be configured using a cost-efficiency arrangement or a power-efficiency arrangement. Further details of the cost-efficiency arrangement and the power-efficiency arrangement of a shared storage device are described later.

After the quantization process memory 1702 is properly configured for a dynamically-loading mode (step 1908/1910) or properly configured for a co-existing mode (step 1904), step 1912 is performed to get quantization calculation parameters read from the quantization table loaded in the quantization process memory 1702 and syntax values (e.g., transform coefficients of residual) generated from the transform circuit 1701. In step 1914, a block level quantization encoding operation is performed to refer to the quantization calculation parameters to perform quantization upon syntax values (e.g., transform coefficients of residual) of each block. In step 1916, the CPU 1730 checks if a switch condition of the source change process is met. For example, when a picture level source change process is employed, the switch condition of the source change process is met if a block level quantization encoding operation has been applied to all macroblocks in a picture. For another example, when a slice level source change process is employed, the switch condition of the source change process is met if a block level quantization encoding operation has been applied to all macroblocks in a slice. For yet another example, when an MB (or LCU/CU) level source change process is employed, the switch condition of the source change process is met if a block level quantization encoding operation has been applied to one macroblock (or all macroblocks in an LCU/CU).

It should be noted that a reconstructed frame is generated in a coding loop of a video encoder to provide reference pixel data used for coding following blocks. For example, inverse scan, inverse quantization, and inverse transform may be included in the coding loop of the video encoder to recover residues that are processed by transform, quantization and scan. Hence, the same proposed storage sharing technique applied to one or both of a spatial-remapping processor (e.g., inverse scan circuit) and a band-remapping processor (e.g., inverse quantization circuit) of a video decoder can also be applied to one or both of a spatial-remapping processor (e.g., inverse scan circuit) and a band-remapping processor (e.g., inverse quantization circuit) of a video encoder. For example, an inverse scan circuit of a video encoder may be implemented using the proposed spatial-remapping processor architecture shown in FIG. 5 or FIG. 6. For another example, an inverse quantization circuit of a video encoder may be implemented using the proposed band-remapping processor architecture shown in FIG. 8 or FIG. 11. These all fall within the scope of the present invention.

As mentioned above, the inverse scan process memory 502/scan process memory 1402 is a shared memory that can be configured in a first mode (e.g., an HEVC mode) or a second mode (e.g., an AVS mode); and the inverse quantization process memory 802/quantization process memory 1702 is a shared memory that can be configured in a first mode (e.g., an HEVC mode), a second mode (e.g., an AVS mode), or a third mode (e.g., a co-existing mode). The present invention further proposes configuring a shared storage device (e.g., inverse scan process memory 502, scan process memory 1402, inverse quantization process memory 802, or quantization process memory 1702) using a cost-efficiency arrangement or a power-efficiency arrangement.

Figure 20:
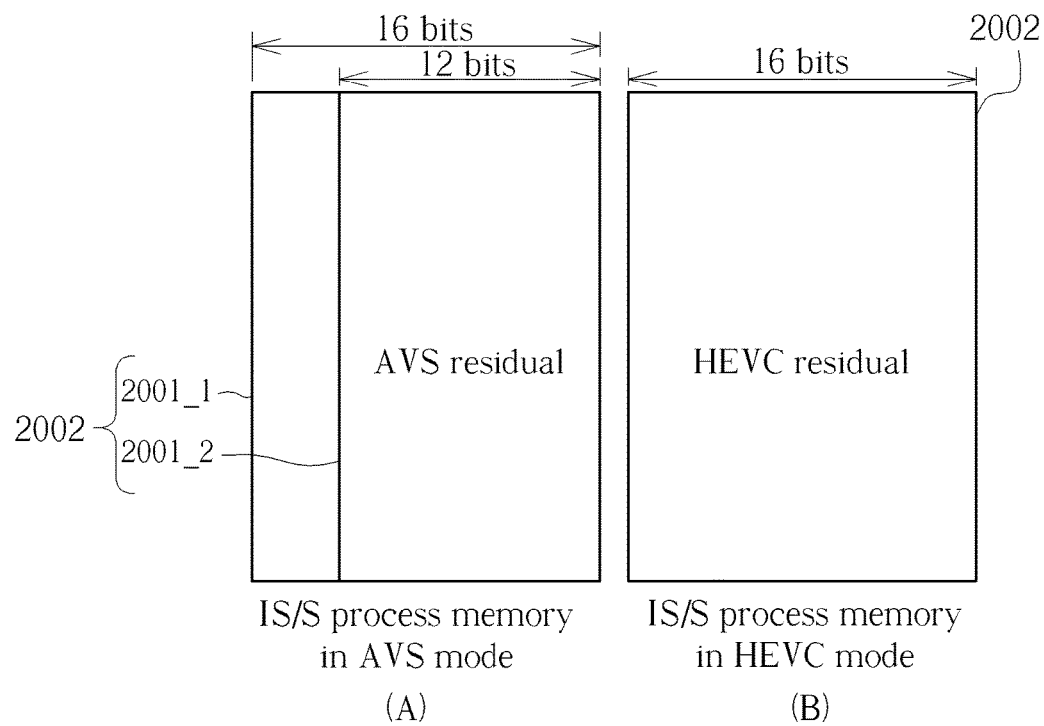
FIG. 20 is a diagram illustrating an inverse scan process memory/scan process memory configured using a cost-efficiency arrangement according to an embodiment of the present invention.

FIG. 20 is a diagram illustrating an inverse scan process memory/scan process memory configured using a cost-efficiency arrangement according to an embodiment of the present invention. In this embodiment, it is assumed that the AVS residual bit-width is 12 bits, and the HEVC residual bit-width is 16 bits. Hence, the size of a shared storage device (e.g., inverse scan process memory 502/scan process memory 1402) is dominated by the HEVC residual bit-width. As shown in sub-diagram (B) of FIG. 20, the shared storage device (e.g., inverse scan process memory 502/scan process memory 1402) has a first storage region 2002 used in an HEVC mode to store data accessed by a first processing circuit (e.g., HEVC inverse scan order processing circuit 504/HEVC scan order processing circuit 1404). In addition, at least a portion of the first storage region 2002 is re-configured to act as a second storage region to store data accessed by a second processing circuit (e.g., AVS inverse scan order processing circuit 506/AVS scan order processing circuit 1406). As shown in sub-diagram (A) of FIG. 20, the first storage region 2002 can be divided into a first storage area 2001_1 and a second storage area 2001_2, where the second storage area 2001_2 is used to act as the second storage region in an AVS mode. Since the second storage area 2001_2 is used in one mode and re-used in another mode, a storage capacity requirement of the shared storage device can be relaxed.

Figure 21:
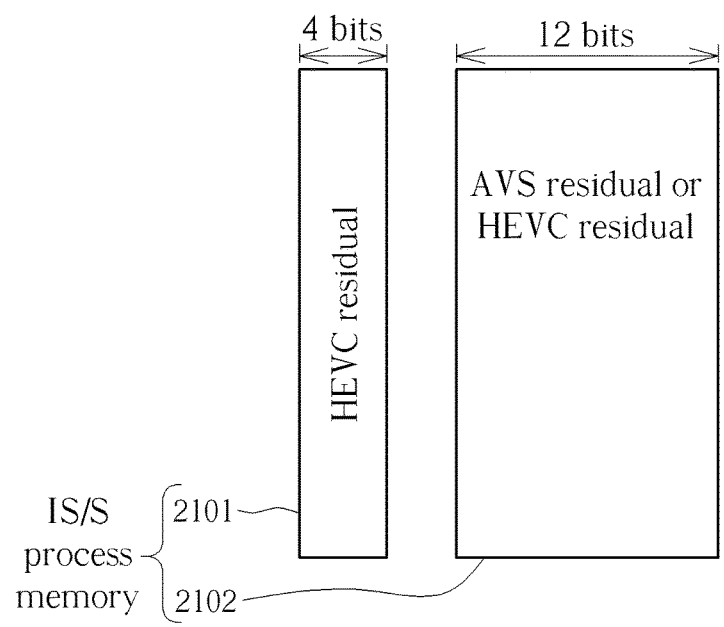
FIG. 21 is a diagram illustrating an inverse scan process memory/scan process memory configured using a power-efficiency arrangement according to an embodiment of the present invention.

FIG. 21 is a diagram illustrating an inverse scan process memory/scan process memory configured using a power-efficiency arrangement according to an embodiment of the present invention. In this embodiment, it is assumed that the AVS residual bit-width is 12 bits, and the HEVC residual bit-width is 16 bits. Hence, the size of a shared storage device (e.g., inverse scan process memory 502/scan process memory 1402) is dominated by the HEVC residual bit-width. In this embodiment, the shared storage device (e.g., inverse scan process memory 502/scan process memory 1402) is composed of a plurality of separate storage elements (e.g., separate SRAMs) 2101 and 2102. When the shared storage device (e.g., inverse scan process memory 502/scan process memory 1402) is configured in an HEVC mode, data accessed by a first processing circuit (e.g., HEVC inverse scan order processing circuit 504/HEVC scan order processing circuit 1404) is stored in the storage elements 2101 and 2102. To access one 16-bit HEVC residual data, one row at a designated row address in the storage element 2101 is turned on, and one row at the same designated row address in the other storage element 2102 is also turned on. However, when the shared storage device (e.g., inverse scan process memory 502/scan process memory 1402) is configured in an AVS mode, data accessed by a second processing circuit (e.g., AVS inverse scan order processing circuit 506/AVS scan order processing circuit 1406) is stored in the storage element 2102 only. To access one 12-bit AVS residual data, one row at a designated row address in the storage element 2102 is turned on, but one row at the same designated row address in the other storage element 2101 is not required to be turned on. In this way, the power consumption of the shared storage device can be effectively reduced under the AVS mode.

Figure 22:
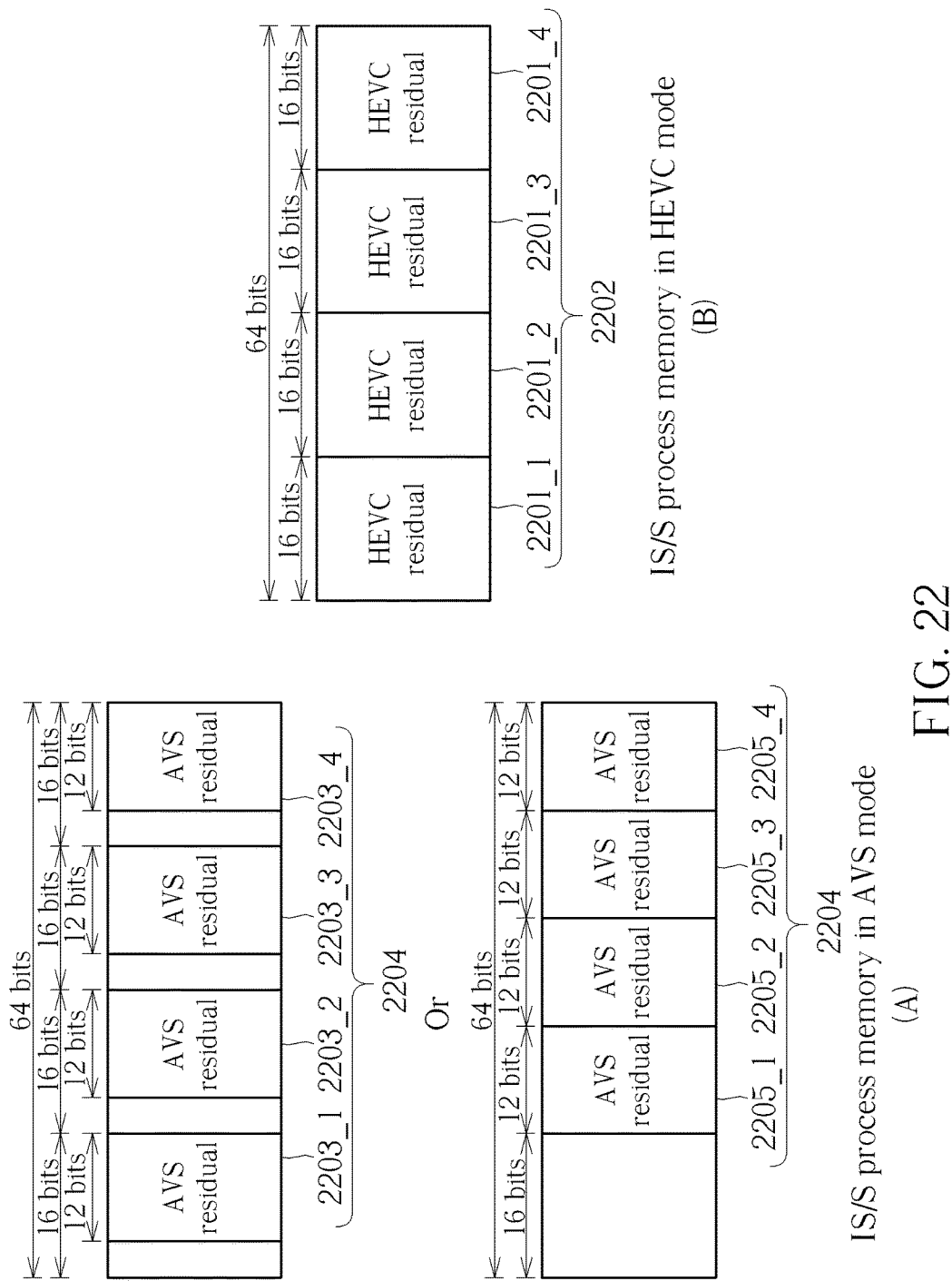
FIG. 22 is a diagram illustrating an inverse scan process memory/scan process memory configured using a high-throughput and cost-efficiency arrangement according to an embodiment of the present invention.

FIG. 22 is a diagram illustrating an inverse scan process memory/scan process memory configured using a high-throughput and cost-efficiency arrangement according to an embodiment of the present invention. In this embodiment, it is assumed that the AVS residual bit-width is 12 bits, and the HEVC residual bit-width is 16 bits. Hence, the size of a shared storage device (e.g., inverse scan process memory 502/scan process memory 1402) is dominated by the HEVC residual bit-width. The shared storage device (e.g., inverse scan process memory 502/scan process memory 1402) has a first storage region 2202 used in an HEVC mode to store data accessed by a first processing circuit (e.g., HEVC inverse scan order processing circuit 504/HEVC scan order processing circuit 1404). In this embodiment, the first processing circuit (e.g., HEVC inverse scan order processing circuit 504/HEVC scan order processing circuit 1404) is arranged to perform HEVC inverse scan operation/HEVC scan operation for a plurality of first pixel data sets (which may correspond to different pictures, different slices, or different MBs (or LCUs/CUs), depending upon the employed source change process). As shown in sub-diagram (B) of FIG. 22, the first storage region 2202 is configured into a plurality of storage areas 2201_1, 2201_2, 2201_3, 2201_4 arranged to store data accessed by the first processing circuit (e.g., HEVC inverse scan order processing circuit 504/HEVC scan order processing circuit 1404) performed for the first pixel data sets concurrently and respectively. In this way, the shared storage device can offer high throughput (e.g., throughput=4) in the HEVC mode.

In addition, at least a portion of the first storage region 2202 is re-configured to act as a second storage region 2204 to store data accessed by a second processing circuit (e.g., AVS inverse scan order processing circuit 506/AVS scan order processing circuit 1406). Since the second storage area 2204 is used in one mode and re-used in another mode, a storage capacity requirement of the shared storage device can be relaxed.

In this embodiment, the second processing circuit (e.g., AVS inverse scan order processing circuit 506/AVS scan order processing circuit 1406) is arranged to perform AVS inverse scan operation/AVS scan operation for a plurality of second pixel data sets (which may correspond to different pictures, different slices, or different MBs (or LCUs/CUs), depending upon the employed source change process). As shown in sub-diagram (A) of FIG. 22, the second storage region 2204 is configured into a plurality of storage areas 2203_1, 2203_2, 2203_3, 2203_4 (or 2205_1, 2205_2, 2205_3, 2205_4) arranged to store data accessed by the second processing circuit (e.g., AVS inverse scan order processing circuit 506/AVS scan order processing circuit 1406) performed for the second pixel data sets concurrently and respectively. In this way, the shared storage device can also offer high throughput (e.g., throughput=4) in the AVS mode.

Figure 23:
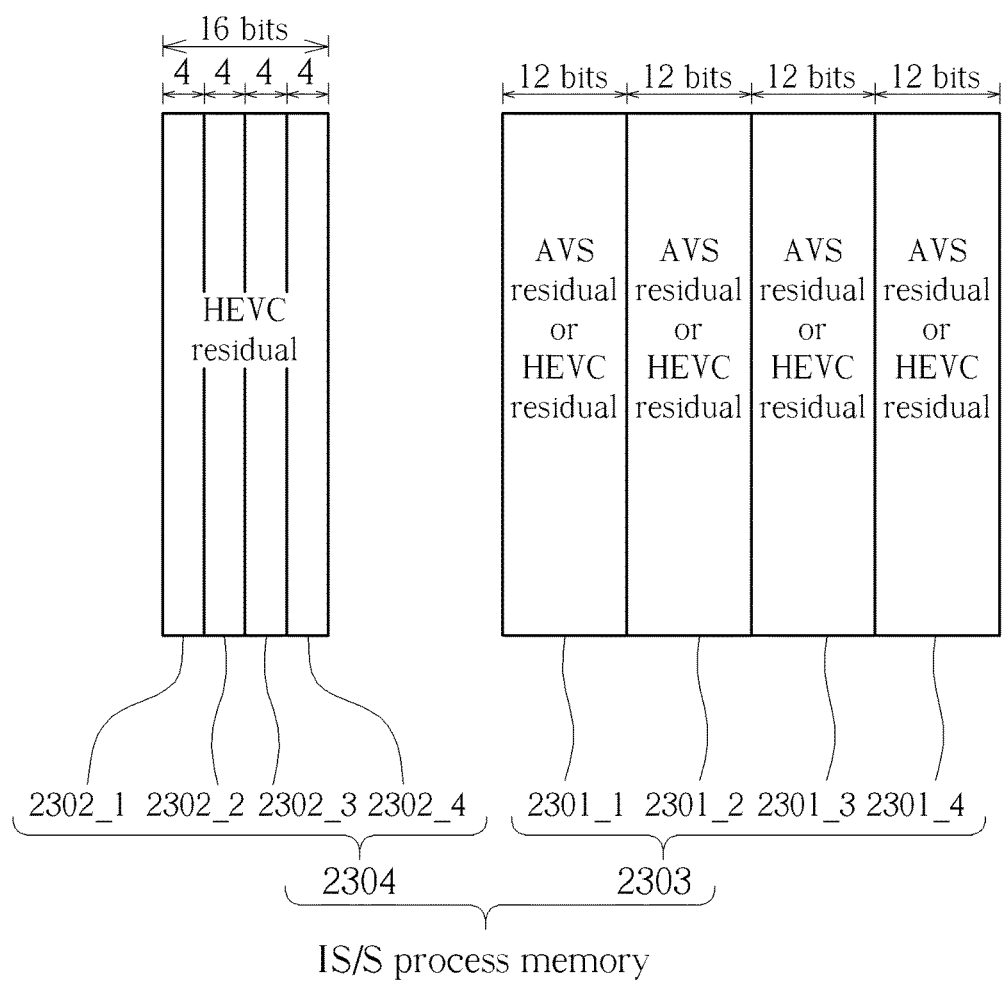
FIG. 23 is a diagram illustrating an inverse scan process memory/scan process memory configured using a high-throughput and power-efficiency arrangement according to an embodiment of the present invention.

FIG. 23 is a diagram illustrating an inverse scan process memory/scan process memory configured using a high-throughput and power-efficiency arrangement according to an embodiment of the present invention. In this embodiment, it is assumed that the AVS residual bit-width is 12 bits, and the HEVC residual bit-width is 16 bits. Hence, the size of a shared storage device (e.g., inverse scan process memory 502/scan process memory 1402) is dominated by the HEVC residual bit-width. In this embodiment, the shared storage device (e.g., inverse scan process memory 502/scan process memory 1402) is composed of a plurality of separate storage elements (e.g., separate SRAMs) 2303 and 2304. When the shared storage device (e.g., inverse scan process memory 502/scan process memory 1402) is configured in an HEVC mode, data accessed by a first processing circuit (e.g., HEVC inverse scan order processing circuit 504/HEVC scan order processing circuit 1404) is stored in the storage elements 2303 and 2304.

Further, the first processing circuit (e.g., HEVC inverse scan order processing circuit 504/HEVC scan order processing circuit 1404) is arranged to perform HEVC inverse scan operation/HEVC scan operation for a plurality of first pixel data sets (which may correspond to different pictures, different slices, or different MBs (or LCUs/CUs), depending upon the employed source change process). As shown in FIG. 23, the storage element 2303 is configured into a plurality of storage areas 2301_1, 2301_2, 2301_3, 2301_4, and the other storage element 2304 is configured into a plurality of storage areas 2302_1, 2302_2, 2302_3, 2302_4, where one of the storage areas 2301_1-2301_4 and one of the storage areas 2302_1-2302_4 form one storage region. For example, the storage areas 2301_1 and 2302_1 form one storage region, the storage areas 2301_2 and 2302_2 form one storage region, the storage areas 2301_2 and 2302_2 form one storage region, and the storage areas 2301_4 and 2302_4 form one storage region. The storage regions formed by the storage areas 2301_1-2301_4 and 2302_1-2302_4 are arranged to store data accessed by the first processing circuit (e.g., HEVC inverse scan order processing circuit 504/HEVC scan order processing circuit 1404) performed for the first pixel data sets concurrently and respectively. In this way, the shared storage device can offer high throughput (e.g., throughput=4) in the HEVC mode.

It should be noted that, to access one 16-bit HEVC residual data, one row at a designated row address in the storage element 2303 is turned on, and one row at the same designated row address in the other storage element 2304 is also turned on. However, when the shared storage device (e.g., inverse scan process memory 502/scan process memory 1402) is configured in an AVS mode, data accessed by a second processing circuit (e.g., AVS inverse scan order processing circuit 506/AVS scan order processing circuit 1406) is stored in the storage element 2303 only. To access one 12-bit AVS residual data, one row at a designated row address in the storage element 2303 is turned on, but one row at the same designated row address in the other storage element 2304 is not required to be turned on. In this way, the power consumption of the shared storage device can be effectively reduced under the AVS mode.

Moreover, the second processing circuit (e.g., AVS inverse scan order processing circuit 506/AVS scan order processing circuit 1406) is arranged to perform AVS inverse scan operation/AVS scan operation for a plurality of second pixel data sets (which may correspond to different pictures, different slices, or different MBs (or LCUs/CUs), depending upon the employed source change process). As shown in FIG. 23, storage areas 2301_1, 2301_2, 2301_3, 2301_4 are arranged to store data accessed by the second processing circuit (e.g., AVS inverse scan order processing circuit 506/AVS scan order processing circuit 1406) performed for the second pixel data sets concurrently and respectively. In this way, the shared storage device can offer high throughput (e.g., throughput=4) in the AVS mode.

Figure 24:
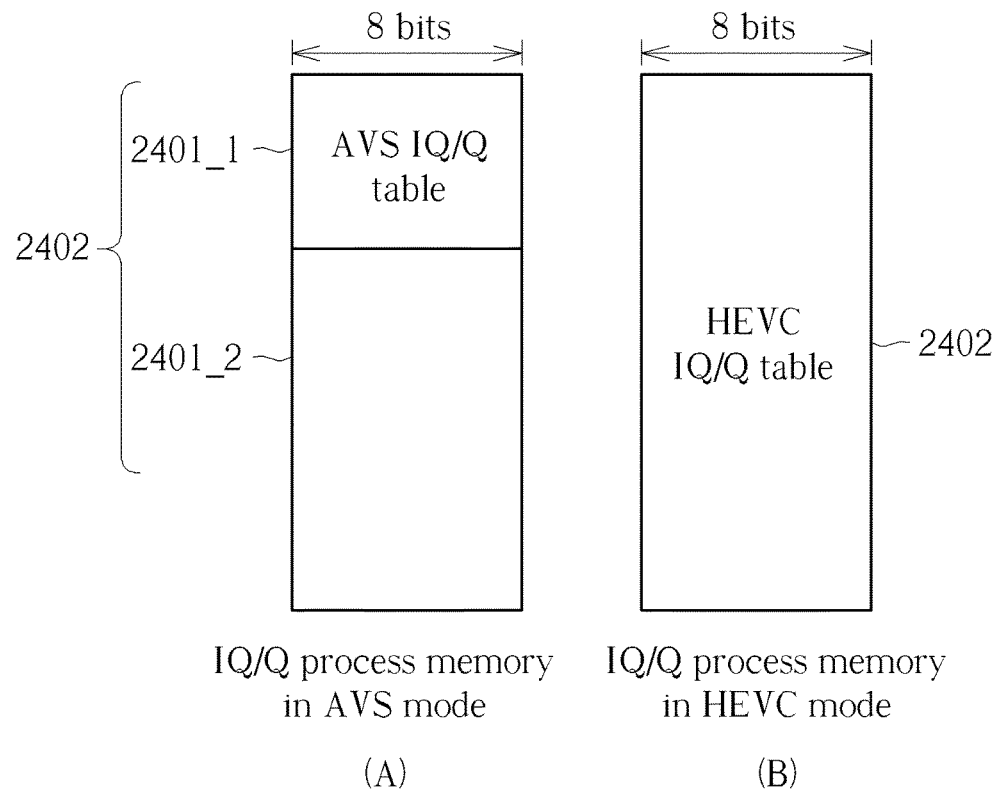
FIG. 24 is a diagram illustrating an inverse quantization process memory/quantization process memory configured using a cost-efficiency arrangement according to an embodiment of the present invention.

FIG. 24 is a diagram illustrating an inverse quantization process memory/quantization process memory configured using a cost-efficiency arrangement according to an embodiment of the present invention. In this embodiment, it is assumed that the size of the HEVC IQ/Q table (e.g., scaling list) is 992×8 bits, and the size of an AVS IQ/Q table is 320×8 bits, where the size of a weight quant matrix is 128×8 bits, the size of a de-quant table is 64×16 bits, and the size of the shift table is 64×8 bits. Alternatively, the AVS IQ/Q table may be composed of one or two of a weight quant matrix, a de-quant table and a shift table only. The size of a shared storage device (e.g., inverse quantization process memory 802/quantization process memory 1702) is dominated by the HEVC IQ/Q table size. However, this is for illustrative purposes only, and is not meant to be a limitation of the present invention.

As shown in sub-diagram (B) of FIG. 24, the shared storage device (e.g., inverse quantization process memory 802/quantization process memory 1702) has a first storage region 2402 used in an HEVC mode to store data accessed by a first processing circuit (e.g., HEVC inverse quantization parameter processing circuit 804/HEVC quantization parameter processing circuit 1704). In addition, at least a portion of the first storage region 2402 is re-configured to act as a second storage region to store data accessed by a second processing circuit (e.g., AVS inverse quantization parameter processing circuit 806/AVS quantization parameter processing circuit 1706). As shown in sub-diagram (A) of FIG. 24, the first storage region 2402 can be divided into a first storage area 2401_1 and a second storage area 2401_1, where the first storage area 2401_1 is used to act as the second storage region used in an AVS mode. Since the first storage area 2401_1 is used in one mode and re-used in another mode, the storage capacity requirement of the sharded storage device can be relaxed.

Figure 25:
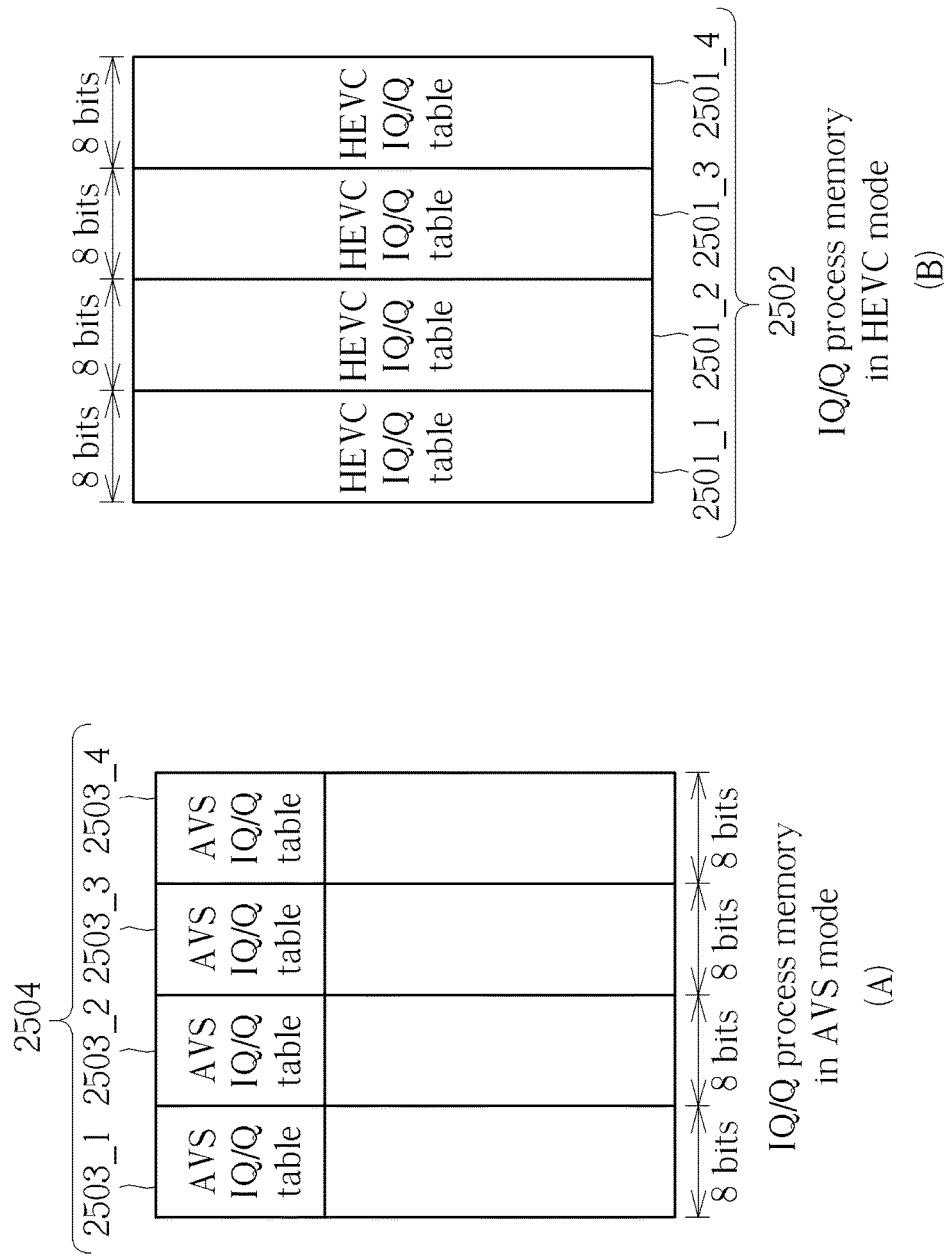
FIG. 25 is a diagram illustrating an inverse quantization process memory/quantization process memory configured using a high-throughput and cost-efficiency arrangement according to an embodiment of the present invention.

FIG. 25 is a diagram illustrating an inverse quantization process memory/quantization process memory configured using a high-throughput and cost-efficiency arrangement according to an embodiment of the present invention. In this embodiment, it is assumed that the size of the HEVC IQ/Q table (e.g., scaling list) is 992×8 bits, and the size of an AVS IQ/Q table is 320×8 bits, where the size of a weight quant matrix is 128×8 bits, the size of a de-quant table is 64×16 bits, and the size of the shift table is 64×8 bits. Alternatively, the AVS IQ/Q table may be composed of one or two of a weight quant matrix, a de-quant table and a shift table only. The size of a shared storage device (e.g., inverse quantization process memory 802/quantization process memory 1702) is dominated by the HEVC IQ/Q table size. However, this is for illustrative purposes only, and is not meant to be a limitation of the present invention.

In this embodiment, the first processing circuit (e.g., HEVC quantization parameter processing circuit 804/HEVC quantization parameter processing circuit 1704) is arranged to perform HEVC inverse quantization operation/HEVC quantization operation for a plurality of first pixel data sets (which may correspond to different pictures, different slices, or different MBs (or LCUs/CUs), depending upon the employed source change process). As shown in sub-diagram (B) of FIG. 25, the first storage region 2502 is configured into a plurality of storage areas 2501_1, 2501_2, 2501_3, 2501_4 arranged to store data accessed by the first processing circuit (e.g., HEVC inverse quantization parameter processing circuit 804/HEVC quantization parameter processing circuit 1704) performed for the first pixel data sets concurrently and respectively. In this way, the shared storage device can offer high throughput (e.g., throughput=4) in the HEVC mode.

In addition, at least a portion of the first storage region 2502 is re-configured to act as a second storage region 2504 to store data accessed by a second processing circuit (e.g., AVS inverse quantization parameter processing circuit 806/AVS quantization parameter processing circuit 1706). Since the second storage region 2504 is used in one mode and re-used in another mode, the storage capacity requirement of the shared storage device can be relaxed.

In this embodiment, the second processing circuit (e.g., AVS inverse quantization parameter processing circuit 806/AVS quantization parameter processing circuit 1706) is arranged to perform AVS inverse quantization operation/AVS quantization operation for a plurality of second pixel data sets (which may correspond to different pictures, different slices, or different MBs (or LCUs/CUs), depending upon the employed source change process). As shown in sub-diagram (A) of FIG. 25, the second storage region 2504 is configured into a plurality of storage areas 2503_1, 2503_2, 2503_3, 2503_4 arranged to store data accessed by the second processing circuit (e.g., AVS inverse quantization parameter processing circuit 806/AVS quantization parameter processing circuit 1706) performed for the second pixel data sets concurrently and respectively. In this way, the shared storage device can offer high throughput (e.g., throughput=4) in the AVS mode.

Figure 26:
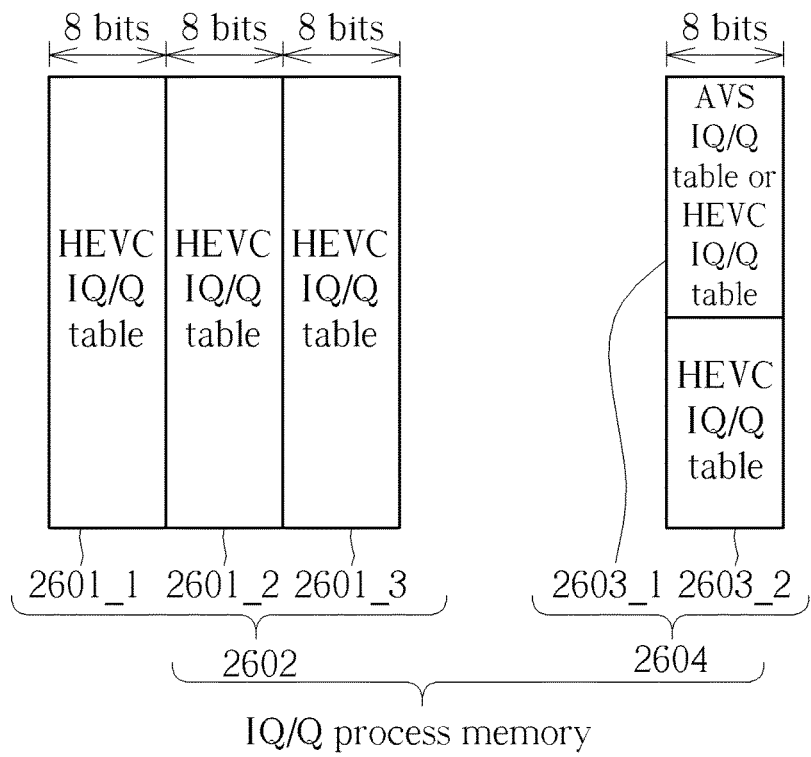
FIG. 26 is a diagram illustrating an inverse quantization process memory/quantization process memory configured using a high-throughput, power-efficiency and cost-efficiency arrangement according to an embodiment of the present invention.

FIG. 26 is a diagram illustrating an inverse quantization process memory/quantization process memory configured using a high-throughput, power-efficiency and cost-efficiency arrangement according to an embodiment of the present invention. In this embodiment, it is assumed that the size of the HEVC IQ/Q table (e.g., scaling list) is 992×8 bits, and the size of an AVS IQ/Q table is 320×8 bits, where the size of a weight quant matrix is 128×8 bits, the size of a de-quant table is 64×16 bits, and the size of the shift table is 64×8 bits. Alternatively, the AVS IQ/Q table may be composed of one or two of a weight quant matrix, a de-quant table and a shift table only. The size of a shared storage device (e.g., inverse quantization process memory 802/quantization process memory 1702) is dominated by the HEVC IQ/Q table size. However, this is for illustrative purposes only, and is not meant to be a limitation of the present invention.

In this embodiment, the AVS IQ/Q table data throughput (throughput=1) is different from (e.g., smaller than) the HEVC IQ/Q table data throughput (throughput=4). In addition, the shared storage device (e.g., inverse quantization process memory 802/quantization process memory 1702) is composed of a plurality of separate storage elements (e.g., separate SRAMs) 2602 and 2604. When the shared storage device (e.g., inverse quantization process memory 802/quantization process memory 1702) is configured in an HEVC mode, data accessed by a first processing circuit (e.g., HEVC quantization parameter processing circuit 804/HEVC quantization parameter processing circuit 1704) is stored in the storage elements 2602 and 2604. However, when the shared storage device (e.g., inverse quantization process memory 802/quantization process memory 1702) is configured in an AVS mode, data accessed by a second processing circuit (e.g., AVS inverse quantization parameter processing circuit 806/AVS quantization parameter processing circuit 1706) is stored in the storage element 2604 only. As shown in FIG. 26, the storage element 2604 is composed of a first storage area 2603_1 and a second storage area 2603_2. The first storage area 2603_1 is re-configured in the AVS mode to store data accessed by a second processing circuit (e.g., AVS inverse quantization parameter processing circuit 806/AVS quantization parameter processing circuit 1706), thus achieving cost-efficiency due to re-using the first storage area 2603_1.

To access one 8-bit AVS IQ/Q table data, one row at a designated row address in the storage element 2604 is turned on, but one row at the same designated row address in the other storage element 2602 is not required to be turned on. In this way, the power consumption of the shared storage device can be reduced under the AVS mode.

Moreover, the first processing circuit (e.g., HEVC quantization parameter processing circuit 804/HEVC quantization parameter processing circuit 1704) is arranged to perform HEVC inverse quantization operation/HEVC quantization operation for a plurality of first pixel data sets (which may correspond to different pictures, different slices, or different MBs (or LCUs/CUs), depending upon the employed source change process). As shown in FIG. 26, the storage element 2602 is configured into a plurality of storage areas 2601_1, 2601_2, 2601_3 and the storage element 2604 is configured into one storage area for storing data accessed by the first processing circuit (e.g., HEVC inverse quantization parameter processing circuit 804/HEVC quantization parameter processing circuit 1704) performed for the first pixel data sets concurrently and respectively. In this way, the shared storage device can offer high throughput (e.g., throughput=4) in the HEVC mode.

Figure 27:
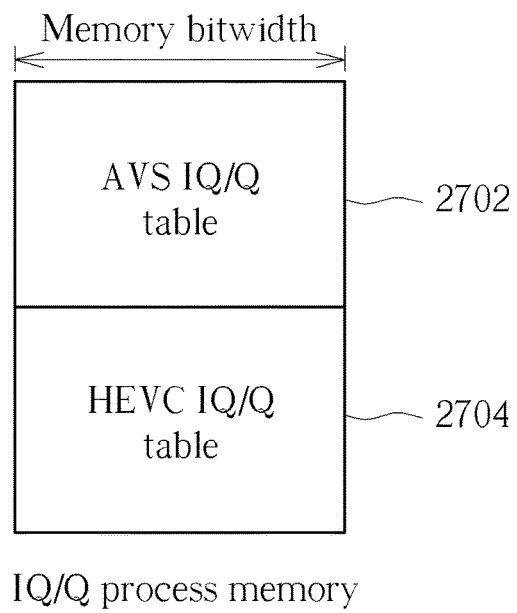
FIG. 27 is a diagram illustrating an inverse quantization process memory/quantization process memory configured in a co-existing mode according to an embodiment of the present invention.

FIG. 27 is a diagram illustrating an inverse quantization process memory/quantization process memory configured in a co-existing mode according to an embodiment of the present invention. In this embodiment, the memory bit-width of a shared storage device (e.g., inverse quantization process memory 802/quantization process memory 1702) is set by IQ/Q table data throughput×8 bits. The shared storage device (e.g., inverse quantization process memory 802/quantization process memory 1702) is a single storage element only, and is configured into non-overlapping storage regions including a first storage region 2702 and a second storage region 2704. The first storage region 2702 is arranged to store data accessed by the second processing circuit (e.g., AVS inverse quantization parameter processing circuit 806/AVS quantization parameter processing circuit 1706), and the second storage region 2704 is arranged to store data accessed by the first processing circuit (e.g., HEVC inverse quantization parameter processing circuit 804/HEVC quantization parameter processing circuit 1704). In this way, data accessed by the first processing circuit (e.g., HEVC inverse quantization parameter processing circuit 804/HEVC quantization parameter processing circuit 1704) and data accessed by the second processing circuit (e.g., AVS inverse quantization parameter processing circuit 806/AVS quantization parameter processing circuit 1706) can co-exist in the same shared storage device.

It should be noted that, when the AVS IQ/Q table data throughput is equal to the HEVC IQ/Q table data throughput and is larger than one, the aforementioned high-throughput arrangement can be incorporated into the co-existing mode shared storage device (e.g., inverse quantization process memory 802/quantization process memory 1702) shown in FIG. 27 to thereby offer high throughput (e.g., throughput=4) in each of the HEVC mode and the AVS mode.

Figure 28:
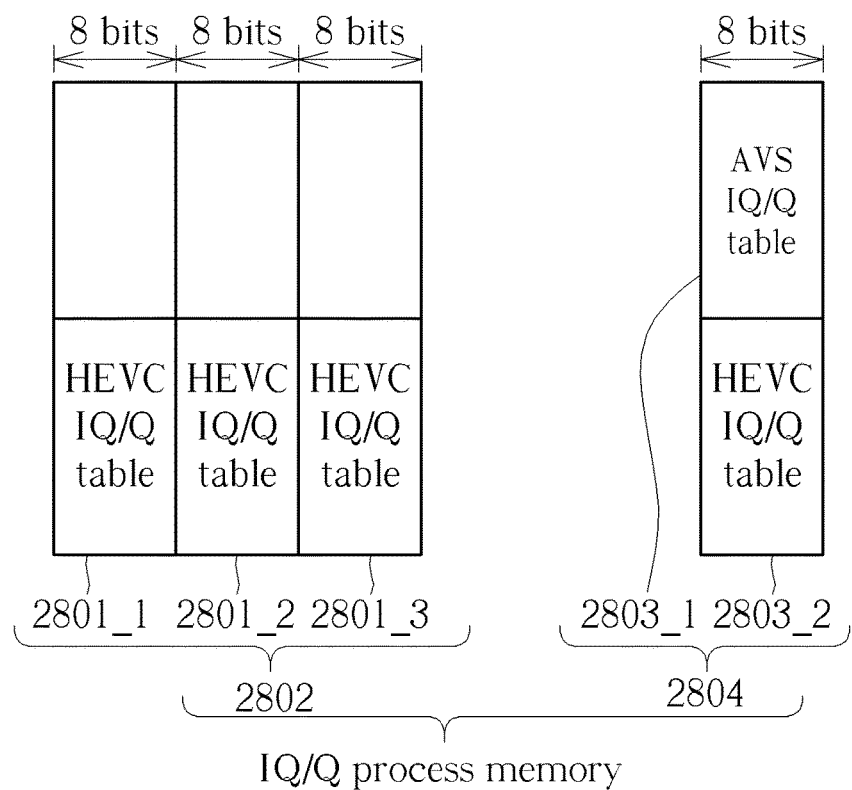
FIG. 28 is a diagram illustrating an inverse quantization process memory/quantization process memory configured using a high-throughput and power-efficiency arrangement in a co-existing mode according to an embodiment of the present invention.

FIG. 28 is a diagram illustrating an inverse quantization process memory/quantization process memory configured using a high-throughput and power-efficiency arrangement in a co-existing mode according to an embodiment of the present invention. In this embodiment, it is assumed that the size of the HEVC IQ/Q table (e.g., scaling list) is 992×8 bits, and the size of an AVS IQ/Q table is 320×8 bits, where the size of a weight quant matrix is 128×8 bits, the size of a de-quant table is 64×16 bits, and the size of the shift table is 64×8 bits. Alternatively, the AVS IQ/Q table may be composed of one or two of a weight quant matrix, a de-quant table and a shift table only. The size of a shared storage device (e.g., inverse quantization process memory 802/quantization process memory 1702) is dominated by the HEVC IQ/Q table size.

In this embodiment, the AVS IQ/Q table data throughput (e.g., throughput=1) is different from (e.g., smaller than) the HEVC IQ/Q table data throughput (e.g., throughput=4). The shared storage device (e.g., inverse quantization process memory 802/quantization process memory 1702) is composed of a plurality of separate storage elements (e.g., separate SRAMs) 2802 and 2804. When the shared storage device (e.g., inverse quantization process memory 802/quantization process memory 1702) is configured in an HEVC mode, data accessed by a first processing circuit (e.g., HEVC quantization parameter processing circuit 804/HEVC quantization parameter processing circuit 1704) is stored in the storage elements 2802 and 2804. However, when the shared storage device (e.g., inverse quantization process memory 802/quantization process memory 1702) is configured in an AVS mode, data accessed by a second processing circuit (e.g., AVS inverse quantization parameter processing circuit 806/AVS quantization parameter processing circuit 1706) is stored in the storage element 2804 only.

As shown in FIG. 28, the storage element 2804 is configured into non-overlapping storage regions including a first storage region 2803_1 and a second storage region 2803_2. The first storage region 2803_1 is arranged to store data accessed by the second processing circuit (e.g., AVS inverse quantization parameter processing circuit 806/AVS quantization parameter processing circuit 1706), and the second storage region 2803_2 is arranged to store a portion of data accessed by the first processing circuit (e.g., HEVC inverse quantization parameter processing circuit 804/HEVC quantization parameter processing circuit 1704). To access one 8-bit AVS IQ/Q table data, one row at a designated row address in the storage element 2804 is turned on, but one row at the same designated row address in the other storage element 2802 is not required to be turned on. In this way, the power consumption of the shared storage device can be effectively reduced under the AVS mode.

Further, the first processing circuit (e.g., HEVC quantization parameter processing circuit 804/HEVC quantization parameter processing circuit 1704) is arranged to perform HEVC inverse quantization operation/HEVC quantization operation for a plurality of first pixel data sets (which may correspond to different pictures, different slices, or different MBs (or LCUs/CUs), depending upon the employed source change process). As shown in FIG. 28, the storage element 2802 is configured into a plurality of storage areas 2801_1, 2801_2, 2801_3 and the storage element 2804 is configured into one storage area 2803_2 for storing data accessed by the first processing circuit (e.g., HEVC inverse quantization parameter processing circuit 804/HEVC quantization parameter processing circuit 1704) performed for the first pixel data sets concurrently and respectively. In this way, the shared storage device can offer high throughput (e.g., throughput=4) in the HEVC mode, and data accessed by the first processing circuit (e.g., HEVC inverse quantization parameter processing circuit 804/HEVC quantization parameter processing circuit 1704) and data accessed by the second processing circuit (e.g., AVS inverse quantization parameter processing circuit 806/AVS quantization parameter processing circuit 1706) can co-exist in the same shared storage device. It should be noted that such a proposed storage arrangement can be achieved by using memory read/write addresses properly configured by address generators (e.g., aforementioned HEVC address generator and AVS address generator) and/or other control units.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video decoder comprising:
    a first processing circuit, arranged to perform a first decoding operation according to data access of a shared storage device;
    a second processing circuit, arranged to perform a second decoding operation according to data access of the shared storage device; and
    a shared processing circuit, arranged to process a first data to be stored into the shared storage device and further arranged to process a second data to be stored into the shared storage device;
    wherein the first decoding operation is at least a portion of a first decoding function complying with a first video coding standard, and the second decoding operation is at least a portion of a second decoding function complying with a second video coding standard different from the first video coding standard;
    wherein at least a portion of the first data stored in the shared storage device is accessed by the first processing circuit, and at least a portion of the second data stored in the shared storage device is accessed by the second processing circuit.

2. The video decoder of claim 1, wherein the first decoding function and the second decoding function are a same decoding function.

3. The video decoder of claim 2, wherein the same decoding function is a spatial-remapping function.

4. The video decoder of claim 2, wherein the same decoding function is a band-remapping function.

5. The video decoder of claim 1, further comprising:
another shared processing circuit, arranged to process data retrieved from the shared storage device by the first processing circuit, and further arranged to process data retrieved from the shared storage device by the second processing circuit.

6. A video encoder comprising:
a first processing circuit, arranged to perform a first encoding operation according to data access of a shared storage device;
a second processing circuit, arranged to perform a second encoding operation according to data access of the shared storage device; and
a shared processing circuit, arranged to process a first data to be stored into the shared storage device and further arranged to process a second data to be stored into the shared storage device;
wherein the first encoding operation is at least a portion of a first encoding function complying with a first video coding standard, and the second encoding operation is at least a portion of a second encoding function complying with a second video coding standard different from the first video coding standard;
wherein at least a portion of the first data stored in the shared storage device is accessed by the first processing circuit, and at least a portion of the second data stored in the shared storage device is accessed by the second processing circuit.

7. The video encoder of claim 6, wherein the first encoding function and the second encoding function are a same encoding function.

8. The video encoder of claim 7, wherein the same encoding function is a spatial-remapping function.

9. The video encoder of claim 7, wherein the same encoding function is a band-remapping function.

10. The video encoder of claim 6, further comprising:
another shared processing circuit, arranged to process data retrieved from the shared storage device by the first processing circuit, and further arranged to process data retrieved from the shared storage device by the second processing circuit.

11. A shared storage device comprising:
at least one storage area, shared by a first operation complying with a first video coding standard and a second operation complying with a second video coding standard different from the first video coding standard;
wherein the at least one storage area is accessed by the first operation according to storage addresses configured for the first operation, and is further accessed by the second operation according to storage addresses configured for the second operation;
wherein a first storage region in the shared storage device is configured to store data accessed by the first operation, and at least a portion of the first storage region comprises the at least one storage area that is re-configured to act as a second storage region to store data accessed by the second operation.

12. The shared storage device of claim 11, wherein the first operation is at least a portion of a band-remapping function complying with the first video coding standard, and the second operation is at least a portion of a band-remapping function complying with the second video coding standard.

13. The shared storage device of claim 11, wherein the first operation is at least a portion of a spatial-remapping function complying with the first video coding standard, and the second operation is at least a portion of a spatial-remapping function complying with the second video coding standard.

14. The shared storage device of claim 13, wherein:
the first operation is arranged to process a plurality of first pixel data sets, and the first storage region is configured into a plurality of first storage areas arranged to store data accessed by the first operation performed for the first pixel data sets concurrently and respectively; and
the second operation is arranged to process a plurality of second pixel data sets, and the second storage region is configured into a plurality of second storage areas arranged to store data accessed by the second operation performed for the second pixel data sets concurrently and respectively.

15. A shared storage device comprising:
a plurality of separate storage elements, comprising a first storage element and a second storage element;
wherein at least one storage area is included in at least the second storage element, the at least one storage area is shared by a first operation complying with a first video coding standard and a second operation complying with a second video coding standard different from the first video coding standard, the at least one storage area is accessed by the first operation according to storage addresses configured for the first operation, and is further accessed by the second operation according to storage addresses configured for the second operation, data accessed by the first operation is stored in at least the first storage element and the second storage element, and data accessed by the second operation is stored in the second storage element but not the first storage element.

16. The shared storage device of claim 15, wherein:
the first operation is arranged to process a plurality of first pixel data sets, the first storage element is configured into a plurality of first storage areas, the second storage element is configured into a plurality of second storage areas, one of the first storage areas and one of the second storage areas form one storage region, and the first storage areas and the second storage areas form a plurality of storage regions arranged to store data accessed by the first operation performed for the first pixel data sets concurrently and respectively; and
the second operation is arranged to process a plurality of second pixel data sets, and the second storage areas of the second storage element are arranged to store data accessed by the second operation performed for the second pixel data sets concurrently and respectively.

17. The shared storage device of claim 15, wherein a first storage region in the second storage element is configured to store a portion of the data accessed by the first operation, and at least a portion of the first storage region is re-configured to act as a second storage region to store the data accessed by the second operation.

18. The shared storage device of claim 17, wherein the first operation is arranged to process a plurality of first pixel data sets, and the first storage element is configured into a plurality of storage areas arranged to store data accessed by the first operation performed for the first pixel data sets concurrently and respectively.

19. The shared storage device of claim 15, wherein a first storage region in the second storage element is configured to store a portion of the data accessed by the first operation, a second storage region in the second storage element is configured to store the data accessed by the second operation, and the data accessed by the first operation and the data accessed by the second operation co-exist in the shared storage device.

20. The shared storage device of claim 19, wherein the first operation is arranged to process a plurality of first pixel data sets, and the first storage element is configured into a plurality of storage areas arranged to store data accessed by the first operation performed for the first pixel data sets concurrently and respectively.

* * * * *